(12) United States Patent
Balakrishnan et al.

(10) Patent No.: US 6,941,487 B1
(45) Date of Patent: Sep. 6, 2005

(54) METHOD, SYSTEM, AND COMPUTER PROGRAM PRODUCT FOR PROVIDING FAILURE PROTECTION IN A NETWORK NODE

(75) Inventors: Thirumalpathy Balakrishnan, Santa Clara, CA (US); Ajay Gaonkar, Sunnyvale, CA (US); Eddy Ng, Los Altos, CA (US)

(73) Assignee: Riverstone Networks, Inc., Santa Clara, CA (US)

(*) Notice: Subject to any disclaimer, the term of this patent is extended or adjusted under 35 U.S.C. 154(b) by 524 days.

(21) Appl. No.: 10/094,393

(22) Filed: Mar. 7, 2002

(51) Int. Cl.[7] .............................................. G06F 11/16
(52) U.S. Cl. ............................ 714/4; 714/13; 370/216
(58) Field of Search ............................. 714/1–6, 13, 15; 370/216; 700/82

(56) References Cited

U.S. PATENT DOCUMENTS

| | | | |
|---|---|---|---|
| 5,193,086 A * | 3/1993 | Satomi et al. ............... 370/228 |
| 5,485,576 A | 1/1996 | Fee et al. | |
| 5,754,804 A | 5/1998 | Cheselka et al. | |
| 5,953,314 A | 9/1999 | Ganmukhi et al. | |
| 6,091,731 A | 7/2000 | Biegaj et al. | |
| 6,108,300 A * | 8/2000 | Coile et al. .................. 370/217 |
| 6,243,826 B1 * | 6/2001 | Quoc et al. ....................... 714/4 |
| 6,570,877 B1 * | 5/2003 | Kloth et al. .................. 370/392 |
| 6,581,166 B1 * | 6/2003 | Hirst et al. ....................... 714/4 |
| 6,678,274 B1 * | 1/2004 | Walia et al. ............ 370/395.52 |
| 6,724,756 B2 * | 4/2004 | Fourie et al. ................. 370/360 |
| 6,751,188 B1 * | 6/2004 | Medved et al. .............. 370/216 |
| 6,751,191 B1 * | 6/2004 | Kanekar et al. ............. 370/217 |
| 6,832,336 B2 * | 12/2004 | Lal ............................... 714/29 |
| 2002/0184572 A1 * | 12/2002 | Lal ............................... 714/43 |
| 2003/0009584 A1 * | 1/2003 | Basso et al. ................. 709/238 |
| 2003/0021232 A1 * | 1/2003 | Duplaix et al. ............. 370/238 |
| 2003/0152075 A1 * | 8/2003 | Hawthorne et al. ......... 370/389 |
| 2003/0154431 A1 * | 8/2003 | Lin et al. ....................... 714/48 |

OTHER PUBLICATIONS

"High Availability for the Catalyst 6000 Family," Cisco Systems, White Paper, Copyright 2001.

* cited by examiner

Primary Examiner—Robert Beausoliel
Assistant Examiner—Philip Guyton
(74) Attorney, Agent, or Firm—Mark A. Wilson

(57) ABSTRACT

Multiple techniques for providing failure protection in a network node that includes primary and secondary control modules (CMs) are disclosed. One technique involves synchronizing configuration state information between the CMs by executing a configuration command within the primary CM and then executing the same configuration command within the secondary CM only if executing the configuration command within the primary CM does not cause the primary CM to fail. Another technique involves gleaning table entries from hardware-based forwarding tables and using the gleaned table entries to generate a software-based forwarding table in the secondary CM. Another technique involves maintaining existing table entries in hardware-based forwarding tables after a switchover, generating orphan table entry links at the secondary CM to the existing table entries in the hardware-based forwarding tables, and then using the links to manage the existing table entries until the secondary CM can re-program the hardware-based forwarding tables.

60 Claims, 20 Drawing Sheets

METHOD, SYSTEM, AND COMPUTER PROGRAM PRODUCT FOR PROVIDING FAILURE PROTECTION IN A NETWORK NODE

FIELD OF THE INVENTION

The invention relates to failure protection in packet-based network nodes, and more particularly to failure protection in packet-based network nodes that include redundant control modules.

BACKGROUND OF THE INVENTION

The goal of failure protection in packet-based network nodes is to minimize the loss of packets when there is a failure of some portion of the network node. Typical network nodes include a series of port interfaces, a switch fabric, and a control module. The port interfaces connect the network node to external network links and manage the input/output operations between the external links and the network node. The switch fabric provides pathways between each port of the network node for the forwarding of packets and the control module performs the central processing activities required to ensure that incoming packets are properly forwarded. Two critical operations performed by the control module involve implementing the protocols that are used by the network node to forward packets and maintaining protocol databases that are generated as a result of implementing the protocols. Example protocols that are implemented by the control module include Layer 2 protocols such as Spanning Tree Protocol (STP), Link Aggregation Control Protocol (LACP), and Layer 2 Learing and Layer 3 protocols such as Open Shortest Path First (OSPF), Border Gateway Protocol (BGP), and Intermediate System-to-Intermediate System (ISIS), where the layers are defined by the International Standards Organization (ISO) in the Open System Interconnect (OSI) model.

The operations performed by the control module are critical to the proper forwarding of packets within a network node and therefore network nodes are commonly equipped with redundant control modules. For example, a network node often includes a primary control module that is actively operating and a secondary control module that can quickly take over in the event of a failure of the primary control module. Even with a secondary control module in place to provide failure protection, packets may still be lost during the switchover from the primary to the secondary control module if the switchover time is too long. In order to minimize the loss of packets in the event of a failure of the primary control module, it is important to minimize the switchover time from the primary control module to the secondary control module. A critical aspect to minimizing switchover time involves providing the secondary control module with quick access to current versions of the protocol databases upon switchover.

One technique for ensuring that the secondary control module has quick access to current versions of the protocol databases involves maintaining an active protocol database in a memory that can be accessed by both the primary and secondary control modules. For example, an active protocol database can be maintained in a shared memory that is accessible to both the primary and secondary control modules. If the primary control module fails, then operation is switched over to the secondary control module and the secondary control module can immediately access the active protocol database in the shared memory. FIG. 1 depicts an embodiment of a network node 100 that includes port interfaces 102A, 102B, and 102C, a switch fabric 104, a primary control module 106, a secondary control module 108, and a shared memory 110. The active protocol database 112 is maintained in the shared memory. Although maintaining the active protocol database in the shared memory and relying on the protocol database in the shared memory for failure protection allows for a fast switchover, if there is a problem with the active protocol database itself or the shared memory in which the protocol database is stored, then switching from the primary to the secondary control module does not provide reliable failure protection. Specifically, if the failure of the primary control module was caused by a problem with the protocol database or the shared memory in which the database is stored, then the same failure is likely to occur in the secondary control module in the event of a switchover.

Another technique for quickly providing a current version of a protocol database to the secondary control module involves maintaining a copy of the active protocol database for the secondary control module. For example, the active protocol database can be maintained on the primary control module and a backup protocol database, which is a copy of the active protocol database, can be maintained on the secondary control module. FIG. 2 depicts a network node 200 with port interfaces 202A, 202B, and 202C, a switch fabric 204, and dual control modules 206 and 208, in which the active protocol database 212 is maintained on the primary control module and the backup protocol database 214 is maintained in the secondary control module. To ensure that proper forwarding decisions are made in the event of a switchover from the primary to the secondary control module, the backup protocol database is kept up to date with the active protocol database through periodic database updates that are sent from the primary control module. A problem with relying on periodic database updates from the primary control module to the secondary control module is that some database updates may not make it to the secondary control module in the event of a failure of the primary control module. If the secondary control module does not receive each periodic database update, then the secondary control module will be left with an incomplete protocol database.

SUMMARY OF THE INVENTION

One technique for providing failure protection in a network node with primary and secondary control modules involves synchronizing configuration state information between the primary and secondary control modules so that the secondary control module has access to accurate configuration state information upon switchover. In accordance with an embodiment of the invention, configuration state information is synchronized between the primary and secondary control modules by executing a configuration command within the primary control module and then executing the same configuration command within the secondary control module only if executing the configuration command within the primary control module does not cause a failure of the primary control module. That is, a configuration command is executed within the secondary control module only after the same configuration command is successfully executed within the primary control module. Executing a configuration command within the secondary control module only if the configuration command does not cause a failure of the primary control module ensures that a bad configuration command does not cause both the primary and secondary control modules to simultaneously fail.

Another technique for providing failure protection in a network node with primary and secondary control modules involves ensuring that the secondary control module has an accurate copy of the latest Layer 2 table entries in a software-based Layer 2 table upon switchover. In accordance with an embodiment of the invention, an accurate copy of the latest Layer 2 table entries is provided to the secondary control module by gleaning Layer 2 table entries from hardware-based Layer 2 tables that are maintained at the port interfaces of the network node and using the gleaned table entries to generate the software-based Layer 2 table in the secondary control module. In an embodiment, the Layer 2 table entries are gleaned from the hardware-based Layer 2 tables upon switchover from the primary to the secondary control module. Because the software-based Layer 2 table in the secondary control module is generated from forwarding information that is gleaned from the hardware-based tables of the port interfaces, the software-based Layer 2 table of the secondary control module accurately reflects the most recent Layer 2 table entries that have been programmed into the hardware-based Layer 2 tables by the primary control module.

Another technique for providing failure protection in a network node with primary and secondary control modules involves the management of existing Layer 3 table entries that are programmed into hardware-based Layer 3 tables of the port interfaces upon switchover. In accordance with an embodiment of the invention, hardware-based Layer 3 table entries are managed by maintaining the existing Layer 3 table entries in the hardware-based Layer 3 tables after a switchover, generating orphan table entry links at the secondary control module to the existing table entries in the hardware-based Layer 3 tables, and then using the links to manage the existing table entries until the secondary control module can re-program the hardware-based L3 tables. In an embodiment, the orphan table entry links are used to systematically delete the existing table entries as new table entries are added by the secondary control module. Because the Layer 3 table entries are temporarily maintained in the hardware-based tables after switchover, traffic is able to be forwarded through the port interfaces using hardware-based lookups while the secondary control module learns new routes and programs new table entries into the hardware-based tables. Moreover, the links to the existing Layer 3 table entries that are generated at switchover are used to systematically delete the existing entries as new entries are added by the secondary control module.

Although different techniques for providing failure protection have been described herein, in an embodiment, all of the above-described techniques are incorporated into the same system to provide a highly reliable failure protection system for a network node. In another embodiment, any combination of the above-described techniques may be incorporated into the same network node to provide failure protection.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
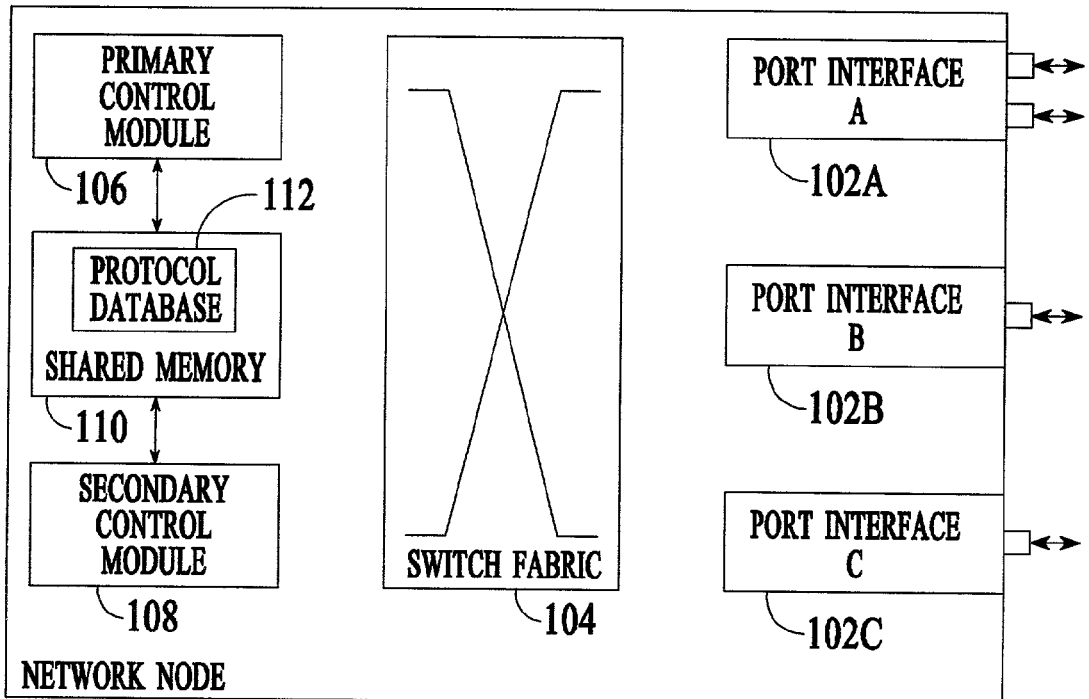
FIG. 1 depicts an embodiment of a network node that includes port interfaces, a switch fabric, a primary control module, a secondary control module, and a shared memory in accordance with the prior art.
Figure 2:
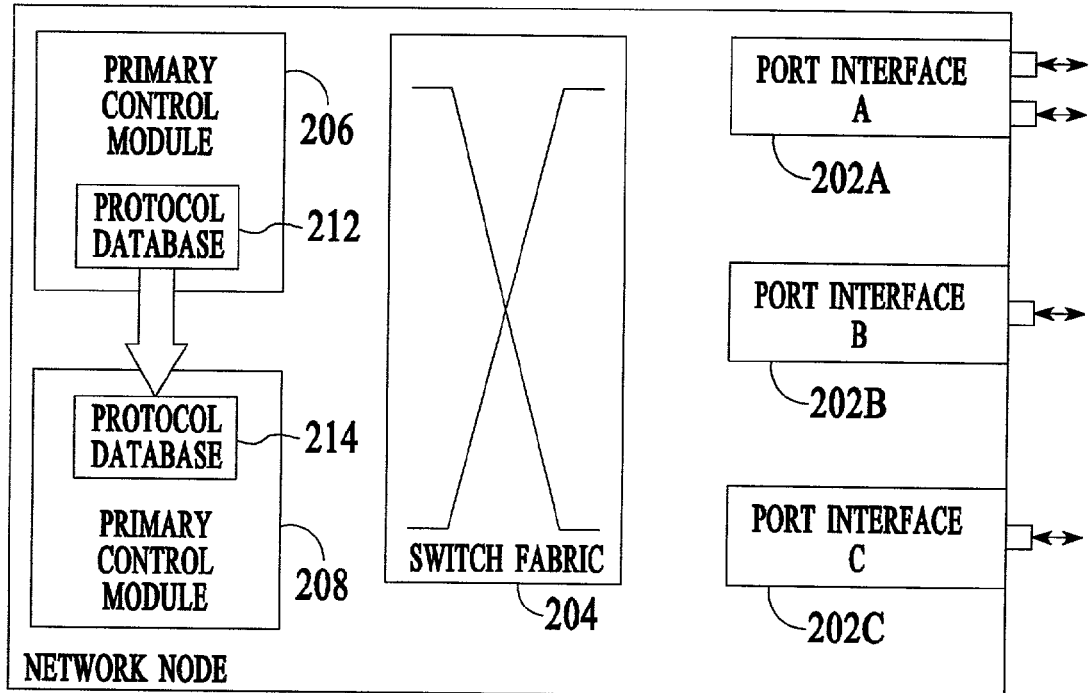
FIG. 2 depicts a network node with dual control modules, in which the active protocol database is maintained on the primary control module and the backup protocol database is maintained on the secondary control module in accordance with the prior art.
Figure 3:
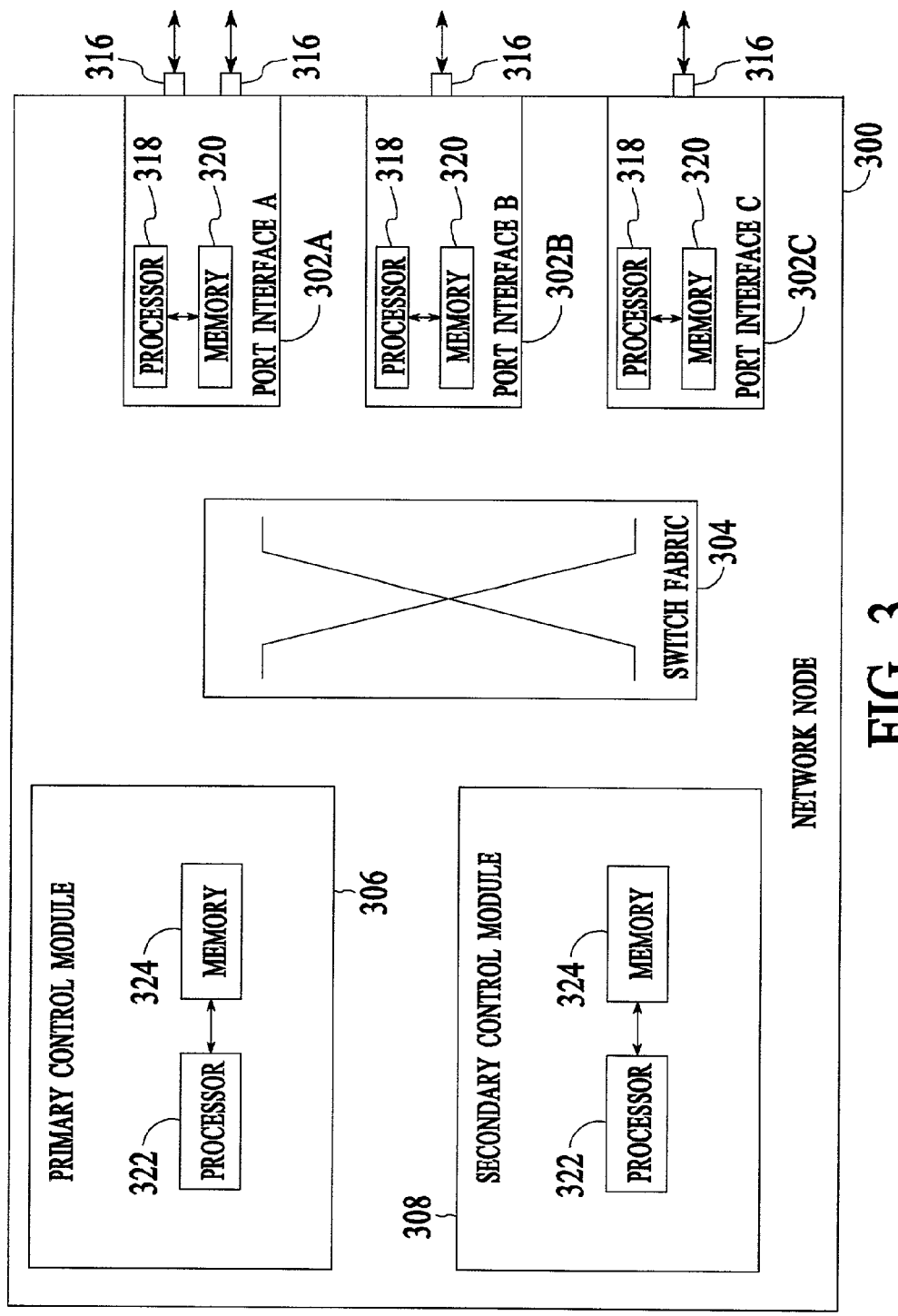
FIG. 3 depicts an embodiment of a network node that includes a primary control module, a secondary control module, a switch fabric, and three port interfaces.

FIG. 3 depicts an embodiment of a network node 300 that includes a primary control module 306, a secondary control module 308, a switch fabric 304, and three port interfaces 302A, 302B, and 302C (port interfaces A, B, and C). The network node handles traffic in discrete segments, often referred to as datagrams. In an embodiment, the network node is an Ethernet switch/router that forwards traffic within the network node using Layer 2, Layer 3, and/or Layer 4 header information. The network node may include port interfaces that support other network protocols such as ATM and Frame Relay. Although an Ethernet-based switch/router is described, the disclosed failure protection techniques can be applied to any network node that utilizes redundant control modules.

Each of the port interfaces includes at least one port 316, a processor 318, and memory 320, which perform functions such as receiving traffic into the network node, buffering traffic, making forwarding decisions, and transmitting traffic from the network node. The processor within each port interface may include a multifunction processor and/or an application specific processor that is operationally connected to the memory. The processor performs functions such as parsing packets, classifying packets, and making forwarding decisions. The memory within each port interface may include circuits for storing operational code, for buffering traffic, and for storing data structures. Operational code is typically stored in non-volatile memory such as electrically erasable programmable read-only memory (EEPROM) or flash ROM while traffic and data structures are typically stored in volatile memory such as random access memory (RAM). Example data structures that are stored in the RAM include configuration state information and traffic forwarding information. Forwarding information may also be stored in content addressable memory (CAM) or a combination of CAM and RAM. Although the processor and memory are depicted as separate functional units, in some instances, the processor and memory are integrated onto the same device.

The switch fabric 304 provides datapaths between input port and output port interfaces and may include, for example, shared memory, shared bus, and crosspoint matrices. Although not depicted, the network node 300 may be equipped with redundant switch fabrics.

The primary and secondary control modules 306 and 308 support various functions, such as network management functions and protocol implementation functions. Example network management functions that are performed by the control modules include implementing configuration commands, providing timing control, programming hardware tables, providing system information, supporting a user interface, managing hardware changes, and bus management. Example protocols that are implemented by the control modules include Layer 2 (L2) protocols, such as L2 Learning, STP, and LACP and Layer 3 (L3) protocols such as OSPF, BGP, and ISIS. The layers are defined by the ISO in the OSI model.

Each of the control modules 306 and 308 includes a processor 322 and memory 324 for carrying out the designated functions. The processor within each control module may include a multifunction microprocessor and/or an application specific processor that is operationally connected to the memory. The memory may include EEPROM or flash ROM for storing operational code and DRAM for buffering traffic and storing data structures. In the embodiment of FIG. 3, the operating system of the network node is run on the control modules. Although the processor and memory are depicted as separate functional units, in some instances, the processor and memory are integrated onto the same device. Throughout the description, similar reference numbers may be used to identify similar elements.

One aspect of failure protection in a network node that includes primary and secondary control modules involves synchronizing configuration state information between the primary and secondary control modules. Configuration state information is information that reflects the current configuration state of the network node. Configuration state information is typically stored in memory in the form of a software-based data structure. The configuration state information is accumulated as a result of configuration commands that are executed by the active control module (in this example, the primary control module). Configuration commands may include hardware configuration commands and user configuration commands. Hardware configuration commands may be generated, for example, in response to link state changes (i.e., link active or link down) and hardware changes(i.e., hot swapping of port interface line cards). User configuration commands may be generated, for example, in response to the management (i.e., establishment or tear down) of Virtual Local Area Networks (VLANs) and Internet Protocol (IP) interfaces. Synchronizing the configuration state information between the primary and secondary control modules ensures continuity of operation at switchover.

In the prior art, configuration state information may be synchronized between the primary and secondary control modules by simultaneously executing each configuration command within both the primary and secondary control modules. A problem with simultaneously executing each configuration command within both the primary and secondary control modules is that if a configuration command is going to cause a failure in the primary control module, then the failure will probably also be caused in the secondary control module. Allowing failures to occur in both the primary and secondary control modules negates the advantages of having redundant control modules.

In accordance with an embodiment of the invention, a technique for providing failure protection in a network node with primary and secondary control modules involves executing a configuration command within the primary control module and then executing the same configuration command within the secondary control module only if executing the configuration command within the primary control module does not cause a failure of the primary control module. That is, the configuration command is executed within the secondary control module only after the configuration command is successfully executed within the primary control module. Executing a configuration command within the secondary control module only if the configuration command does not cause a failure of the primary control module ensures that a bad configuration command does not cause both the primary and secondary control modules to simultaneously fail.

Figure 4:
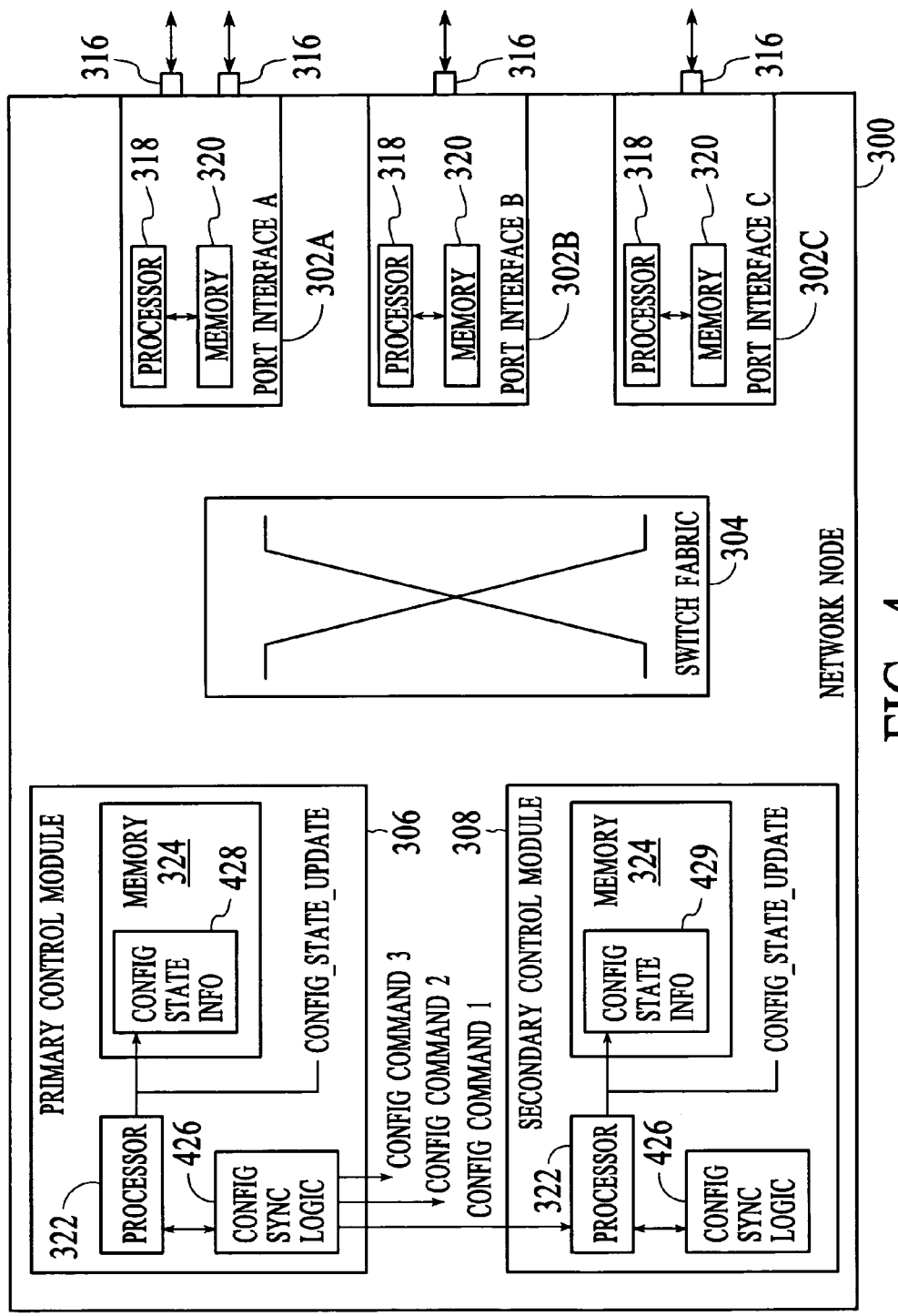
FIG. 4 depicts an embodiment of a network node that includes configuration logic that provides failure protection in a network node with primary and secondary control modules in accordance with an embodiment of the invention by allowing a configuration command to be executed within the secondary control module only if executing the configuration command within the primary control module does not cause a failure of the primary control module.

FIG. 4 depicts a network node 4300 that includes a system for implementing the above-described failure protection technique. The network node includes primary and secondary control modules 4306 and 4308, with each control module including a processor 4322, memory 4324, and configuration synchronization logic 426. Referring to the primary control module, the processor executes received configuration commands and updates the configuration state information 428 that is stored in the memory. The configuration synchronization logic of the primary control module determines whether or not a configuration command is executed within the secondary control module. Execution of a configuration command within the secondary control module causes the configuration state information 429 of the secondary control module to be updated. As described above, a configuration command is executed within the secondary control module only if execution of the configuration command within the primary control module does not cause a failure of the primary control module. In the embodiment of FIG. 4, both the primary and secondary control modules include configuration synchronization logic so that the configuration synchronization logic can be implemented by the secondary control module upon switchover. In the embodiment of FIG. 4, the configuration synchronization logic is embodied in computer program code (i.e., software), that is stored in the memory and implemented by the processor.

In an embodiment, each configuration command is received by both the primary and secondary control modules 4306 and 4308. Each configuration command that is received by the secondary control module is held by the secondary control module until the corresponding configuration command that is received by the primary control module is successfully executed. Upon successful execution of the configuration command by the primary control module, a signal is provided to the secondary control module indicating that the corresponding configuration command can be executed by the secondary control module.

In another embodiment, initially only the primary control module 406 receives each configuration command. Each configuration command is forwarded from the primary control module to the secondary control module 4308 only after the configuration command is successfully executed within the primary control module. Referring to the example of FIG. 4, three configuration commands are executed by the primary control module and then forwarded to the secondary control module only if the executed commands do not cause the primary control module to fail. Specifically, configuration command 1 is executed within the primary control module and then forwarded to the secondary control module if the executed configuration command does not cause the primary control module to fail. The same process is repeated for configuration commands 2 and 3. As depicted in FIG. 4, the configuration synchronization logic 426 of the primary control module determines whether or not each configuration command is forwarded to, and subsequently executed by, the secondary control module.

Figure 5:
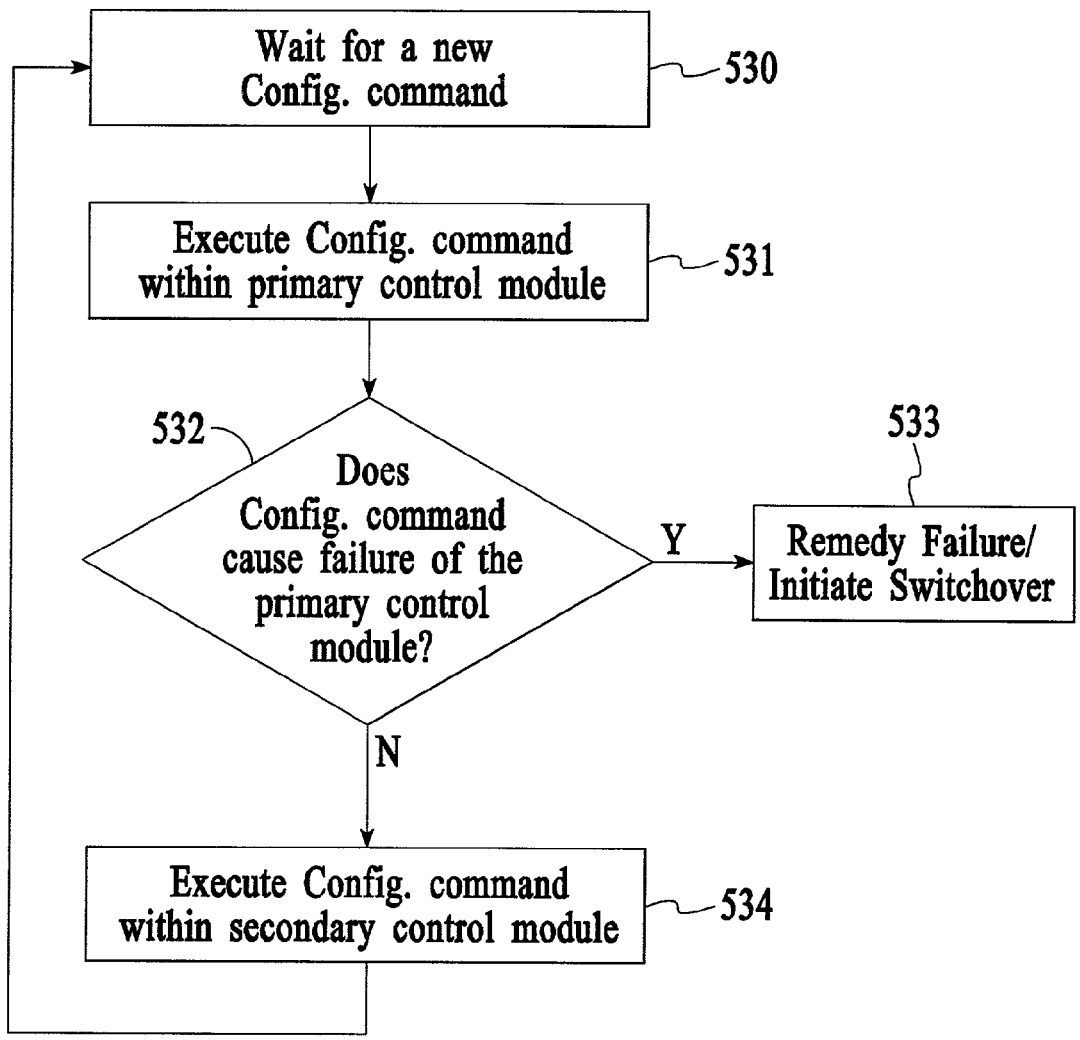
FIG. 5 depicts a process flow diagram of a method for synchronizing configuration state information between primary and secondary control modules in accordance with an embodiment of the invention.

FIG. 5 depicts an embodiment of a process flow diagram of the above-described technique for synchronizing configuration state information between the primary and secondary control modules. At step 530, there is a wait for a new configuration command. Upon receiving a new configuration command, at step 531, the configuration command is executed within the primary control module. At decision point 532, it is determined whether or not execution of the configuration command causes a failure of the primary control module. If execution of the configuration command causes a failure of the primary control module, then action is taken to remedy the failure and a switchover to the secondary control module is initiated, step 533. In an embodiment, the failure may be remedied without switching over to the secondary control module, although this is implementation specific. If execution of the configuration command does not cause a failure of the primary control module, then at step 534, the configuration command is executed within the secondary control module. The process is repeated for each configuration command.

Figure 6:
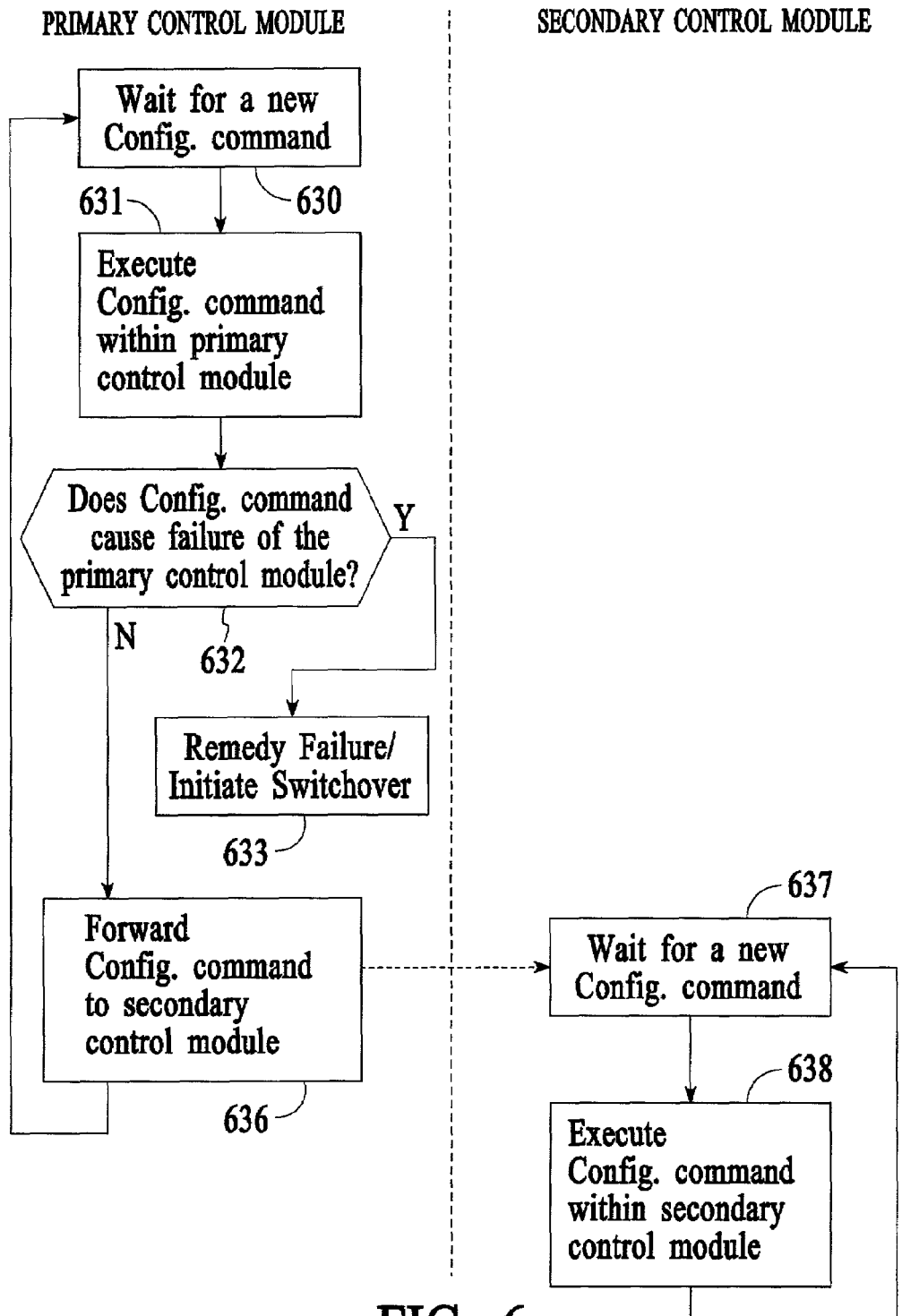
FIG. 6 depicts another process flow diagram of a method for synchronizing configuration state information between primary and secondary control modules in accordance with an embodiment of the invention.

FIG. 6 depicts another embodiment of a process flow diagram of the above-described technique for synchronizing configuration state information between the primary and secondary control modules. The process flow diagram of FIG. 6 provides steps that are specific to the primary and secondary control modules in an embodiment where configuration commands are forwarded to the secondary control module only if the configuration commands do not cause a failure of the primary control module. At step 630, the primary control module waits for a new configuration command. Upon receiving a new configuration command, at step 631, the configuration command is executed within the primary control module. At decision point 632, it is determined whether or not execution of the configuration command causes a failure of the primary control module. If execution of the configuration command causes a failure of the primary control module, then action is taken to remedy the failure and a switchover to the secondary control module is initiated, step 633. In an embodiment, the failure may be remedied without switching over to the secondary control module, although this is implementation specific. If execution of the configuration command does not cause a failure of the primary control module, then at step 636, the configuration command is forwarded to the secondary control module. With respect to the primary control module, the steps 630–636 are repeated for each configuration command.

With respect to the secondary control module, at step 637, the secondary control module waits to receive a new configuration command. Upon receiving a new configuration command, at step 638, the configuration command is executed within the secondary control module and the process is repeated.

What constitutes a failure of a control module is implementation specific. For example, a failure may be declared even though the control module is still operable. In an embodiment, a configuration command failure is declared in response to particular failure types (also referred to as errors). For example, errors related to mathematical errors (i.e., division by zero, no pointer references), memory corruption, hardware failures, and continuous loop processing may trigger a failure while other less significant errors may not trigger a failure. Although the specific nature of the configuration command failure is implementation specific, once a configuration command failure has been declared, the configuration command that caused the failure is not executed by the secondary control module.

In the network node described with reference to FIG. 3, some traffic is forwarded based on Layer 2 information as defined by the ISO in the OSI model. For example, traffic can be forwarded based on media access control (MAC) addresses in Ethernet packet headers or virtual circuit (VC) information in asynchronous transfer mode (ATM) cell headers. Forwarding traffic based on Layer 2 information involves comparing Layer 2 information in the traffic headers to forwarding information that is learned from previous traffic or established through user commands. In some high-speed network nodes, Layer 2 forwarding information (i.e., in the form of table entries) is accumulated centrally at the primary control module 306 in a software-based table and programmed into hardware-based tables for use in high-speed traffic forwarding. In an embodiment, table entries are fixed sized data structures that include source and/or destination addresses, exit port information, priority/quality of service information, and traffic type information.

Figure 7:
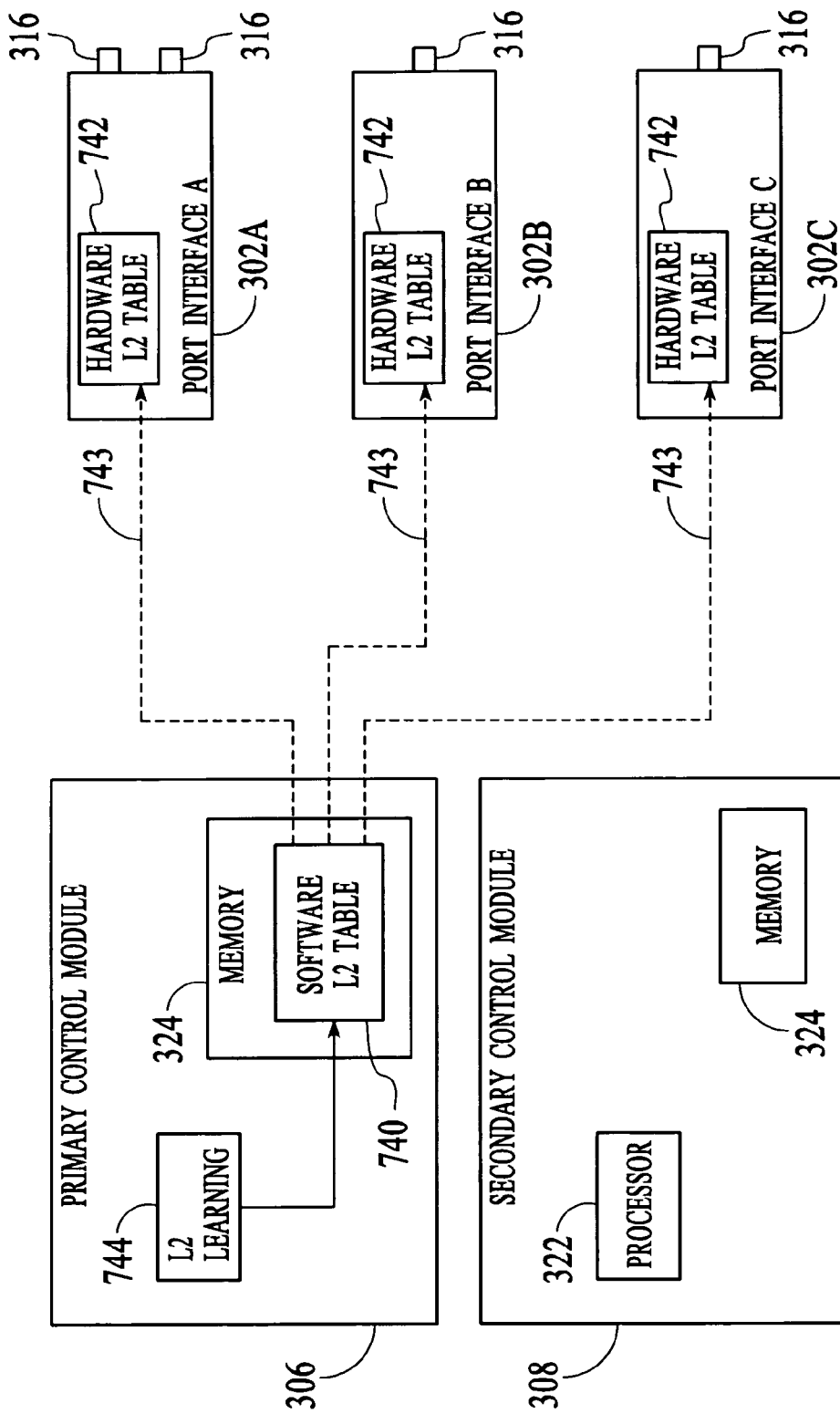
FIG. 7 is a logical depiction of the distribution of software-based Layer 2 forwarding information from the primary control module to hardware-based Layer 2 tables at the port interfaces of a network node.

FIG. 7 is a logical depiction of the distribution of Layer 2 forwarding information from the software-based Layer 2 table 740 at the primary control module 306 of a network node to the hardware-based Layer 2 tables 742 at the port interfaces 302A–302C. In the embodiment of FIG. 7, Layer 2 forwarding information is generated as a result of Layer 2 learning that is implemented by the processor of the primary control module and represented by the Layer 2 learning functional unit 744. The forwarding information is stored in the software-based L2 table within the primary control module. Forwarding information from the software-based Layer 2 table of the primary control module is then selectively programmed into the hardware-based Layer 2 tables at the port interfaces as indicated by dashed lines 743. Typically, the forwarding information that is programmed into the hardware-based Layer 2 tables at the port interfaces is specific to each port interface.

In an embodiment, software-based tables, such as the software-based Layer 2 table, are flexible data structures that can be organized and searched in different ways. As is known in the field, software-based forwarding tables are supported by an operating system, processor, and memory. In an embodiment, hardware-based forwarding tables, such as the hardware-based Layer 2 tables, are specific data structures that are organized for hardware-based access. As is known in the field, hardware-based forwarding tables are supported by specific memory cells, such as CAM cells or RAM cells.

Figure 8:
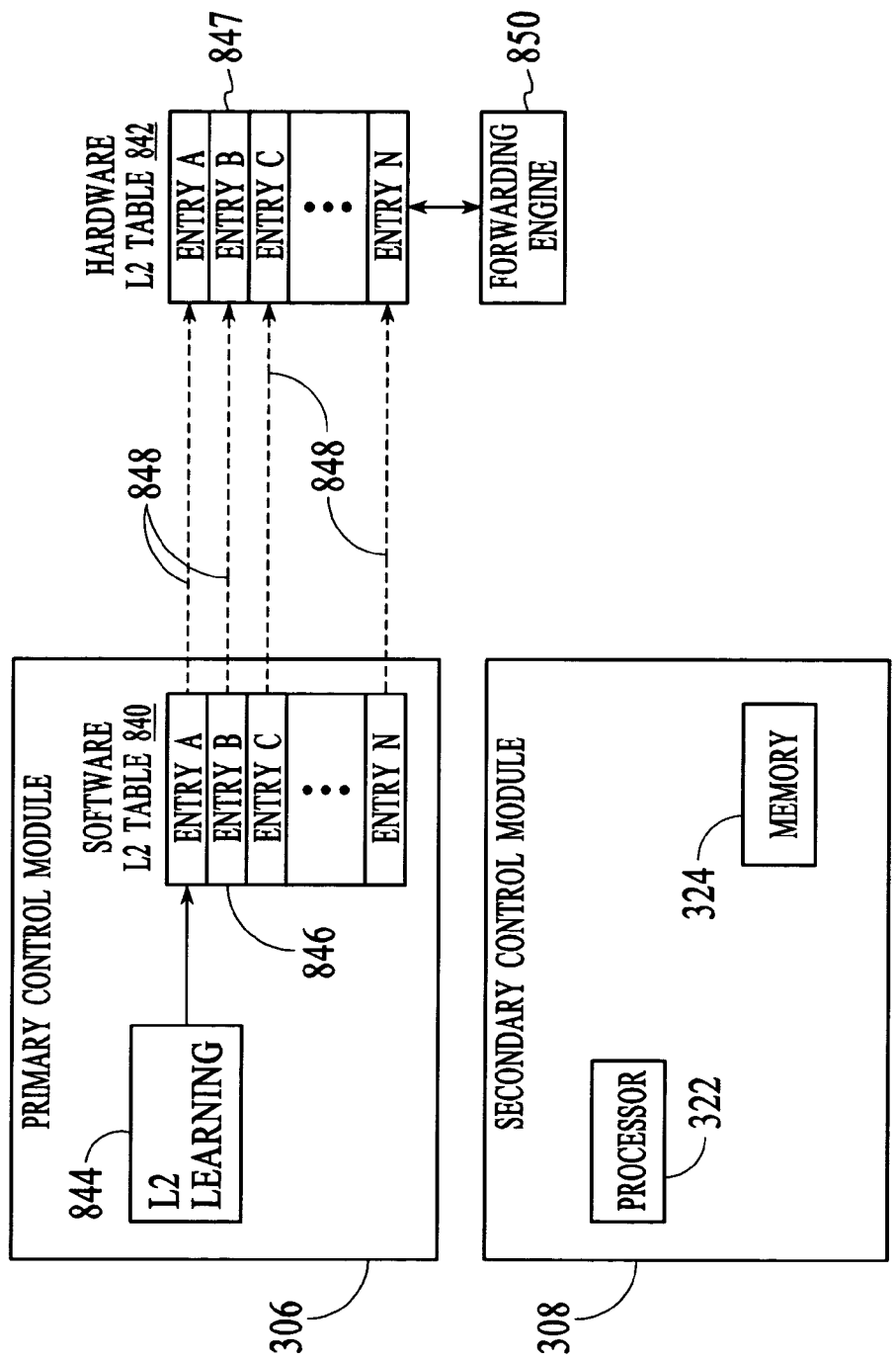
FIG. 8 depicts an expanded view of software-based Layer 2 table entries that are programmed into one of the hardware-based Layer 2 tables of FIG. 7.

FIG. 8 depicts an expanded view of software-based Layer 2 table entries 846 that are programmed into a hardware-based Layer 2 table 842 as hardware-based Layer 2 table entries 847. In the embodiment of FIG. 8, the Layer 2 table entries are generated as a result of Layer 2 learning that is performed by the Layer 2 learning functional unit 844 that is implemented by the processor. The Layer 2 table entries are programmed into the memory of the port interfaces, as indicated by dashed lines 848, and their locations within the memory of the port interfaces are identified by table entry links. In an embodiment, the table entry links are software pointers that identify the location of the table entries in the hardware-based Layer 2 tables. The hardware-based table entries are used by the forwarding engine 850 to make rapid forwarding decisions for incoming packets.

Figure 9:
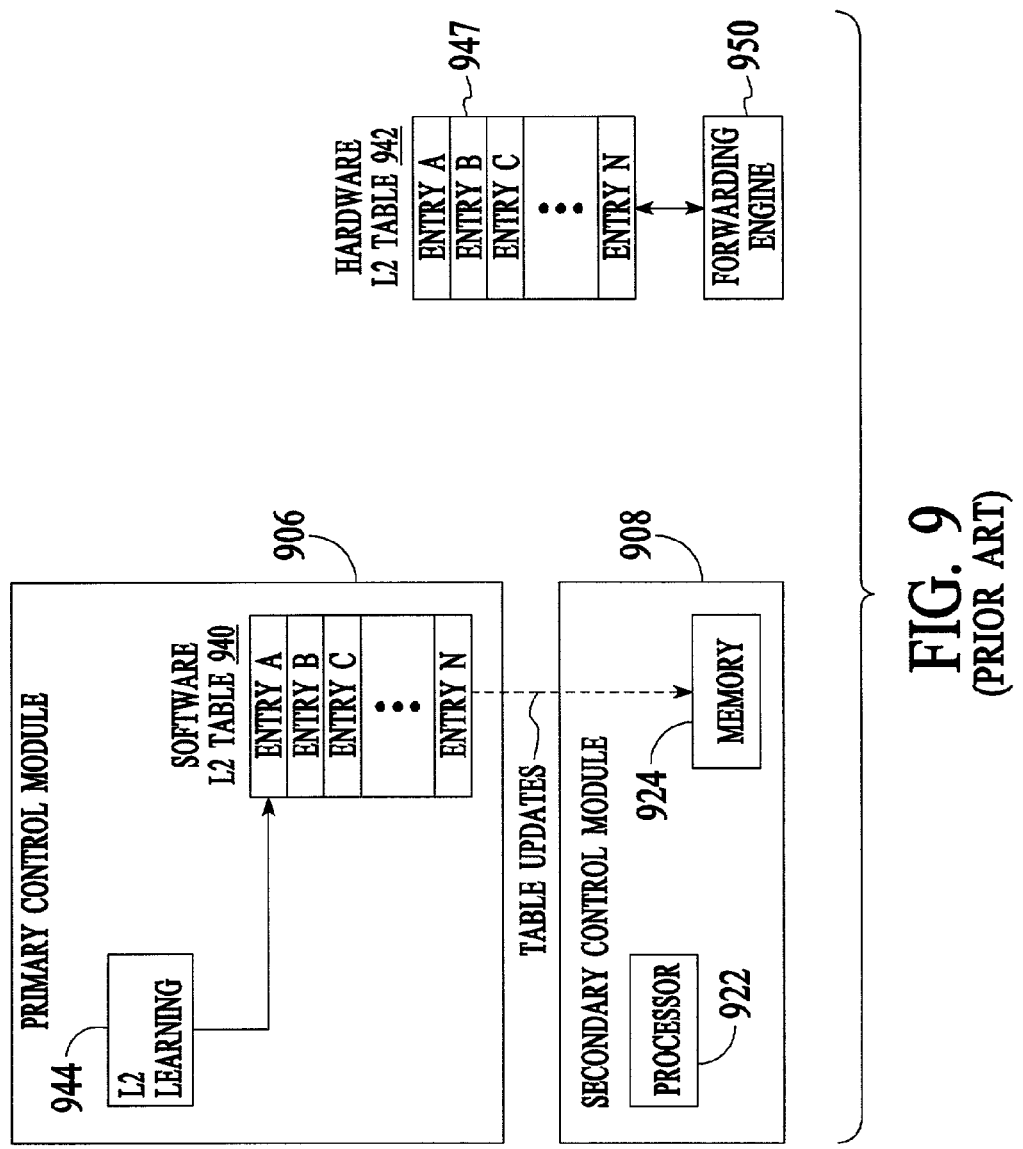
FIG. 9 depicts an embodiment of a network node in which periodic updates of the software-based Layer 2 table are provided directly to the secondary control module from the software-based Layer 2 table of the primary control module in accordance with the prior art.

In order to provide failure protection in a network node with primary and secondary control modules, a copy of the software-based Layer 2 table from the primary control module is stored in the memory of the secondary control module. The copy of the software-based Layer 2 table is used by the secondary control module in the event of a switchover. An aspect of failure protection in a network node that includes primary and secondary control modules involves synchronizing the software-based Layer 2 tables of the primary and secondary control modules to ensure forwarding consistency after a switchover. In an example of the prior art, the software-based Layer 2 tables of the primary and secondary control modules are synchronized by providing periodic updates of the Layer 2 table from the primary control module to the secondary control module. FIG. 9 depicts an embodiment of a network node in which periodic updates of the software-based Layer 2 table are provided directly to the secondary control module 908 from the software-based Layer 2 table 940 of the primary control module 906 in accordance with the prior art. A problem with providing periodic updates from the primary control module to the secondary control module is that discrepancies may exist between the hardware-based Layer 2 tables 942 that are programmed into the port interfaces and the software-based Layer 2 table of the secondary control module. These discrepancies may arise because some table changes that are programmed into the hardware-based Layer 2 tables by the primary control module shortly before a switchover may not yet be incorporated into the software-based table of the secondary control module at the time of switchover. Discrepancies between the hardware-based Layer 2 tables of the port interfaces and the software-based Layer 2 table of the secondary control module can cause problems and delays in packet forwarding.

In accordance with an embodiment of the invention, a technique for providing failure protection in a network node with primary and secondary control modules involves synchronizing the software-based Layer 2 tables of the primary and secondary control modules by gleaning Layer 2 table entries from the hardware-based Layer 2 tables to form the Layer 2 table in the secondary control module. In an embodiment, Layer 2 table entries are gleaned from the hardware-based Layer 2 tables of the port interfaces to form the software-based Layer 2 table in the secondary control module. Because the Layer 2 table entries in the secondary control module are gleaned from the hardware-based tables of the port interfaces, the Layer 2 table of the secondary control module accurately reflects the most recent Layer 2 table changes that have been programmed into the hardware-based Layer 2 tables by the primary control module.

Figure 10:
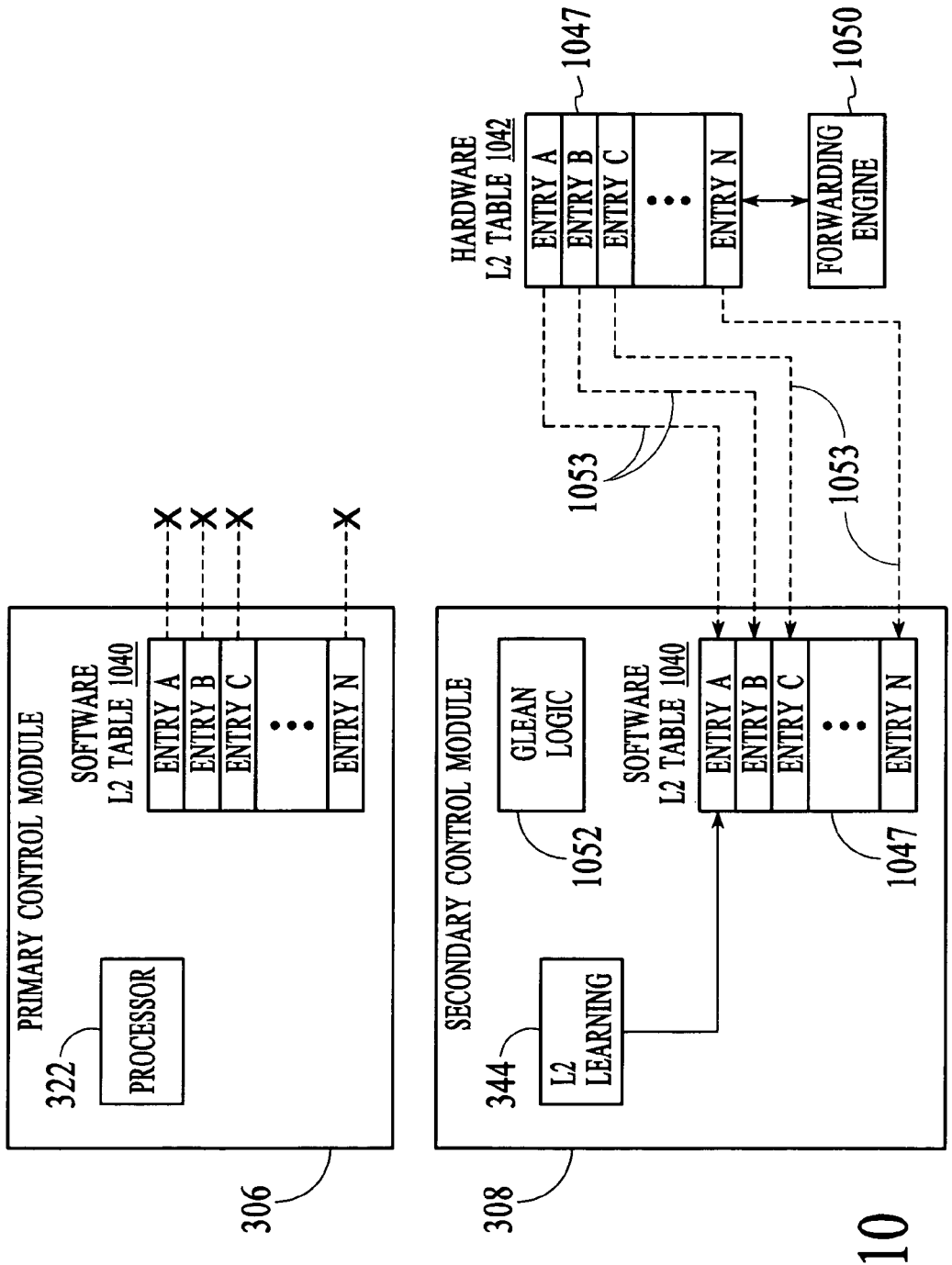
FIG. 10 is a logical depiction of an embodiment of a system for synchronizing information that is stored in software-based Layer 2 tables of the primary and secondary control modules by gleaning information from hardware-based tables in accordance with an embodiment of the invention.

FIG. 10 is a logical depiction of an embodiment of the above-described technique for synchronizing the information that is stored in the software-based Layer 2 tables 1040 of the primary and secondary control modules 306 and 308. As depicted in FIG. 10, Layer 2 table entries 1047 are gleaned from the hardware-based Layer 2 tables of the port interfaces to construct the software-based Layer 2 table 1040 in the secondary control module 1008. In an embodiment, the gleaning of table entries involves parsing through, or reading, the table entries from the hardware-based forwarding table and forwarding the table entries to the control modules.

The secondary control module includes glean logic 1052 that manages the gleaning of Layer 2 table entries from the hardware-based forwarding tables of the port interfaces. In the embodiment of FIG. 10, the glean logic is software code that is stored in the memory of the control module and executed by the control module processor. The gleaning of information from the hardware-based forwarding tables of the port interfaces is initiated by control commands from the glean logic. Table entries that are gleaned from the hardware-based Layer 2 tables of the port interfaces are used to build the software-based Layer 2 table of the secondary control module as indicated by dashed lines 1053. Once the secondary control module takes over operation of the network node, the software-based Layer 2 table can be used to forward traffic through the network node.

Figure 11:
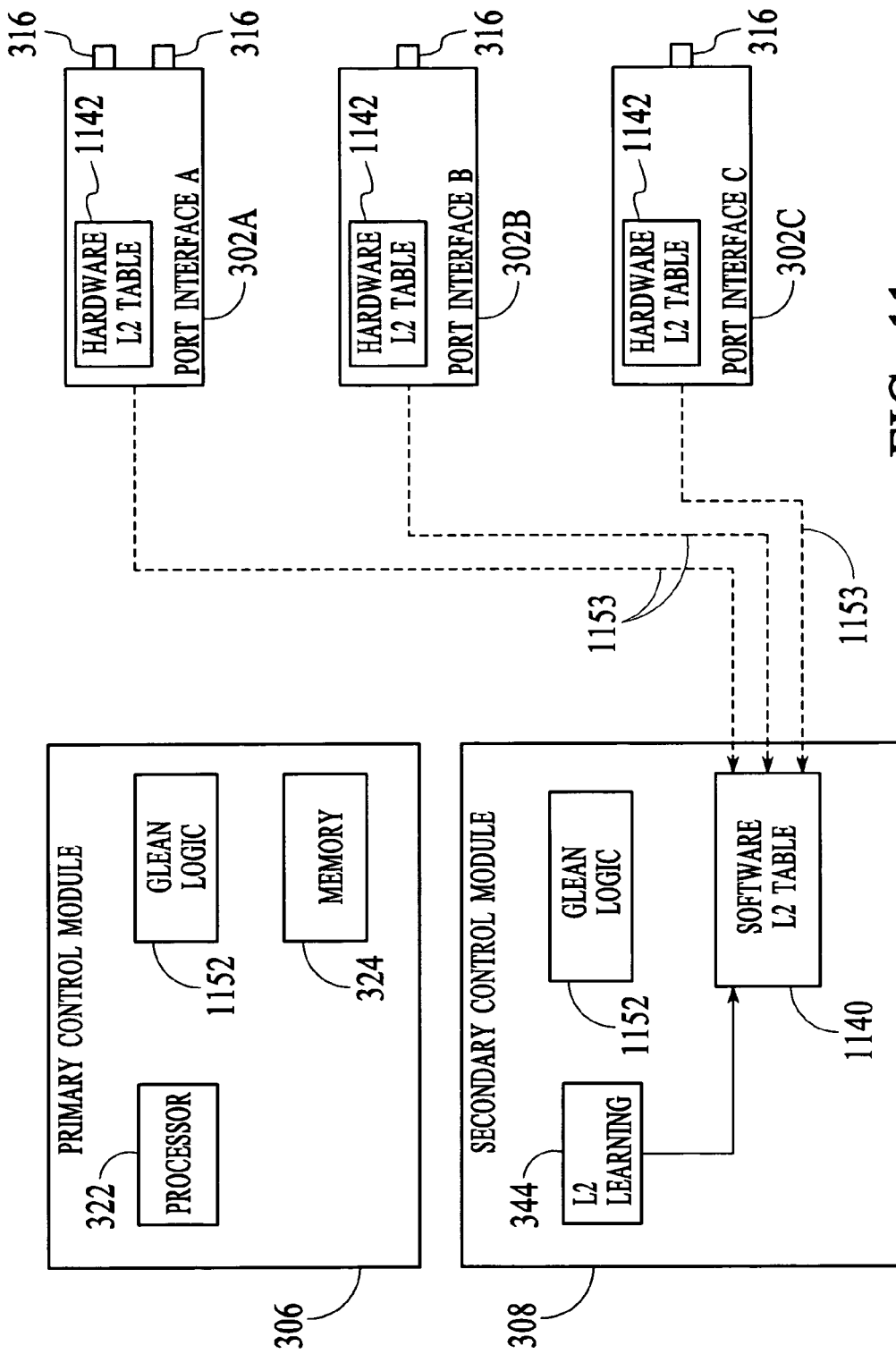
FIG. 11 depicts an embodiment of a network node after switchover from the primary control module to the secondary control module in which information is gleaned from multiple hardware-based Layer 2 tables to form the software-based Layer 2 table in the secondary control module in accordance with an embodiment of the invention.

FIG. 11 depicts an embodiment of a network node after switchover from the primary 306 to the secondary control module 308 in which table entries are gleaned from multiple hardware-based Layer 2 tables 1142 to form the software-based Layer 2 table 1140 in the secondary control module. The glean logic 1152 in the secondary control module gleans Layer 2 table entries from the hardware-based Layer 2 tables of multiple port interfaces 302A–302C as indicated by lines 1153 and the gleaned table entries are used to build the software-based Layer 2 table in the secondary control module. In the embodiment of FIG. 11, the primary control module also includes glean logic so that the same process can be implemented when the primary control module is the backup control module.

Although the technique for synchronizing information in the software-based tables of the primary and secondary control modules is described with reference to Layer 2 table entries, the technique can be used to synchronize any software-based forwarding information that is programmed into hardware-based tables. For example, software-based Layer 3 forwarding information in the primary and secondary control modules can be synchronized by gleaning Layer 3 table entries from hardware-based Layer 3 tables that are programmed for high-speed forwarding.

In an embodiment, all of the Layer 2 table entries are gleaned from the hardware-based Layer 2 tables at switchover from the primary to the secondary control module. That is, the entire software-based Layer 2 table is generated in the secondary control module at switchover. The gleaning of Layer 2 table entries at switchover ensures that the most recent Layer 2 table information is used to generate the software-based Layer 2 table of the secondary control module. In another embodiment, some of the Layer 2 table entries are gleaned from the hardware-based Layer 2 tables before switchover with a final gleaning done at switchover. For example, the secondary control module may build its software-based Layer 2 table before switchover by periodically gleaning table entries from the hardware-based forwarding tables and then performing a final gleaning at switchover.

Figure 12:
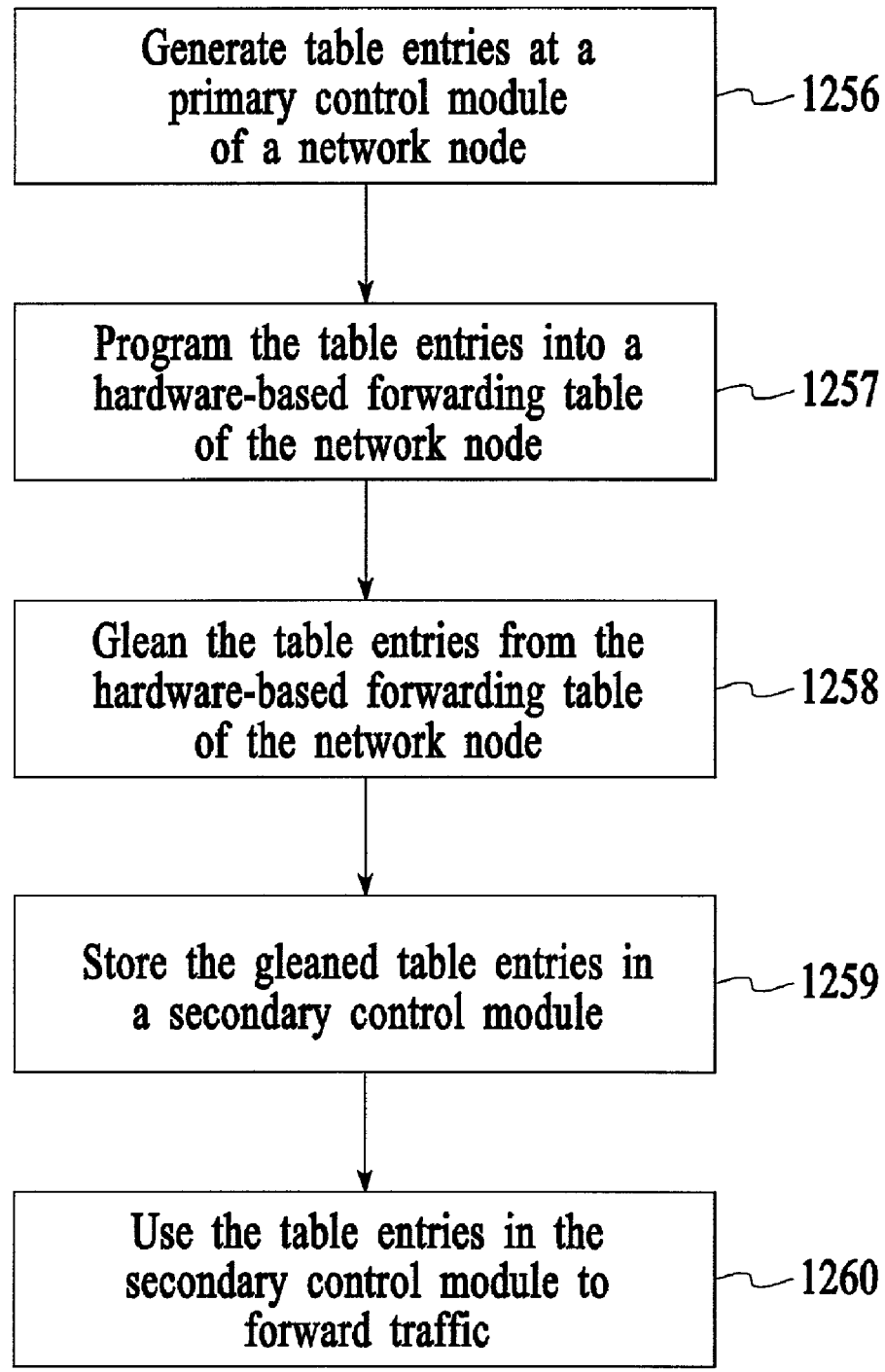
FIG. 12 depicts a process flow diagram of a method for synchronizing information that is stored in software-based forwarding tables of the primary and secondary control modules in accordance with an embodiment of the invention.

FIG. 12 depicts an embodiment of a process flow diagram of the above-described technique for synchronizing information that is stored in the software-based forwarding tables of the primary and secondary control modules. At step 1256, table entries are generated at a primary control module of a network node. At step 1257, the table entries are programmed into a hardware-based table of the network node. At step 1258, the table entries are gleaned from the hardware-based forwarding table of the network node. At step 1259, the gleaned table entries are stored in a secondary control module. At step 1260, the table entries in the secondary control module are used to forward traffic. In the process flow diagram of FIG. 12, a switchover is not required to trigger the gleaning of table entries. That is, table entries can be gleaned from the hardware-based forwarding table before switchover.

Figure 13:
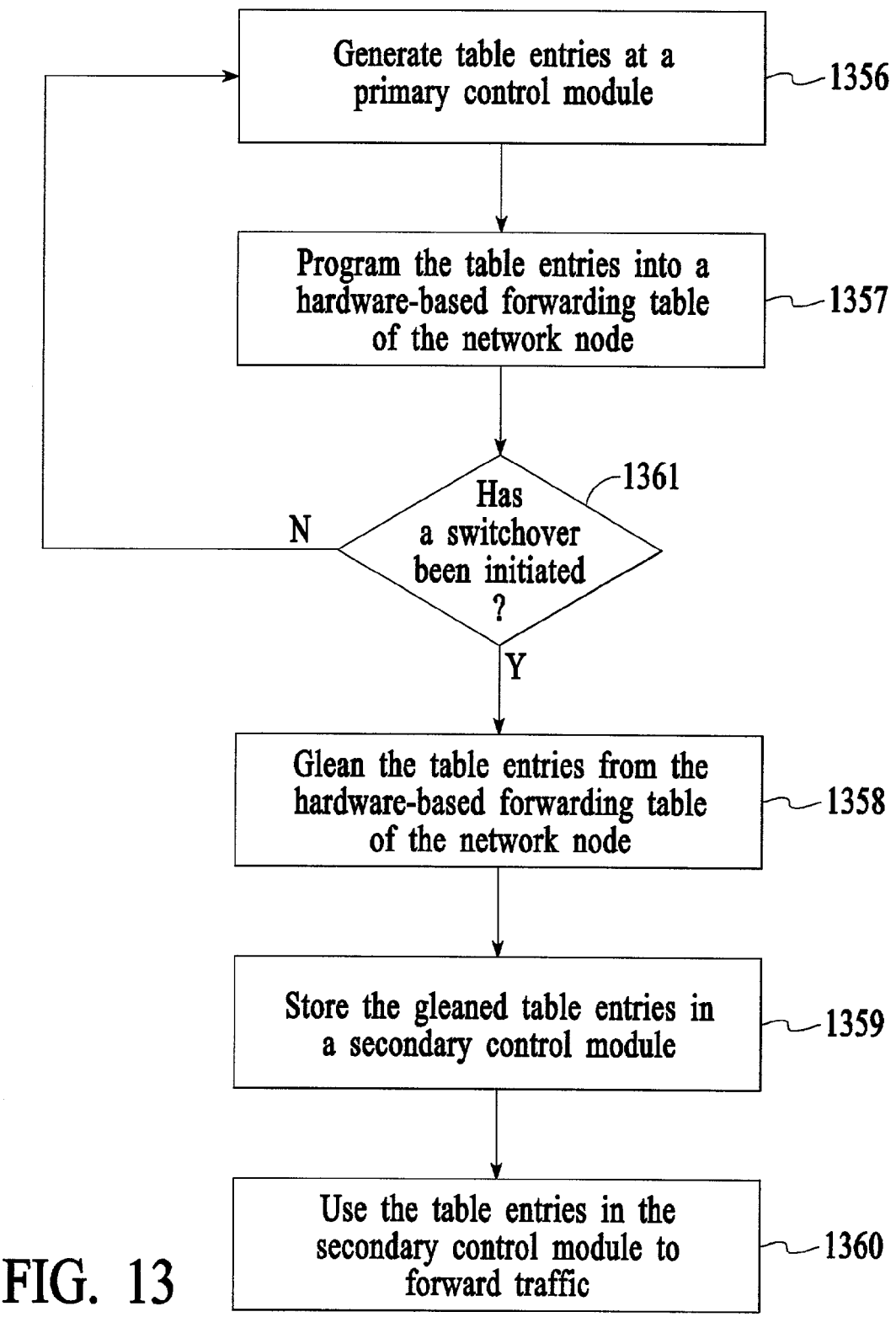
FIG. 13 depicts another process flow diagram of a method for synchronizing information that is stored in the software-based forwarding tables of the primary and secondary control modules in accordance with an embodiment of the invention.

FIG. 13 depicts another process flow diagram of the above-described technique for synchronizing information that is stored in the software-based forwarding tables of the primary and secondary control modules. At step 1356, table entries are generated at a primary control module of a network node. At step 1357, the table entries are programmed into a hardware-based forwarding table of the network node. At decision point 1361, it is determined whether or not a switchover has been initiated. If a switchover has not been initiated, then the process returns to step 1356. If a switchover has been initiated, then at step 1358, the table entries are gleaned from the hardware-based forwarding table of the network node. At step 1359, the gleaned table entries are stored in a secondary control module. At step 1360, the table entries in the secondary control module are used to forward packets. In the process flow diagram of FIG. 13, a switchover is initiated before forwarding information is gleaned from the hardware-based forwarding table.

In the network node 300 described with reference to FIG. 3, some traffic is forwarded based on Layer 3 information. For example, traffic is forwarded based on IP source and destination addresses. Forwarding traffic based on Layer 3 information, also referred to as "routing," involves comparing information in the Layer 3 headers to forwarding information that is learned from previous traffic or established through user commands. Forwarding information is learned by running Layer 3 protocols such as OSPF, BGP, and ISIS. Forwarding information, in the form of Layer 3 table entries may include Layer 3 source and/or destination addresses that are mapped to next hop IP addresses and output ports of the network node. In some high-speed network nodes, Layer 3 table entries are accumulated centrally in the primary control module 306 and programmed into hardware-based tables at the port interfaces 302A–302C for use in high-speed forwarding.

Figure 14:
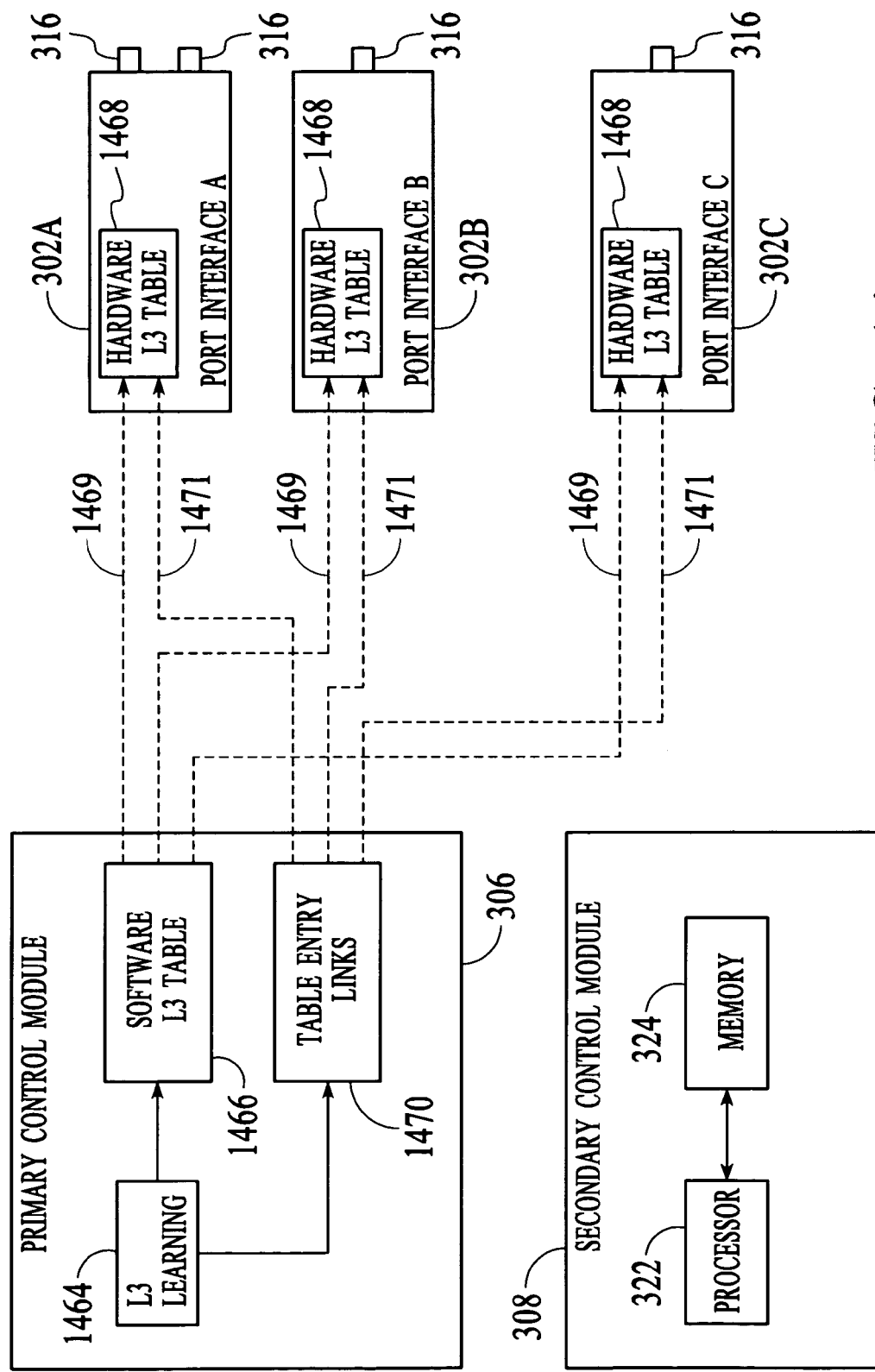
FIG. 14 is a logical depiction of the distribution of Layer 3 forwarding information within a network node from a software-based Layer 3 table to multiple hardware-based Layer 3 tables.

FIG. 14 is a logical depiction of the distribution of Layer 3 table entries within a network node. The network node of FIG. 14 includes a primary control module 306, a secondary control module 308, and port interfaces 302A–302C as described above with reference to FIG. 3. Referring to the primary control module, various Layer 3 protocols are executed by the Layer 3 learning functional unit 1464 and Layer 3 table entries (also referred to as route entries) are generated. The Layer 3 table entries are stored in memory in a software-based L3 table 1466. To enable high-speed traffic forwarding, the Layer 3 table entries are also programmed into hardware-based Layer 3 tables 1468 at the port interfaces as indicated by dashed lines 1469. In an embodiment, the Layer 3 table entries are programmed on a port-specific basis, such that only entries related to a particular port interface are programmed at the particular port interface.

Figure 15:
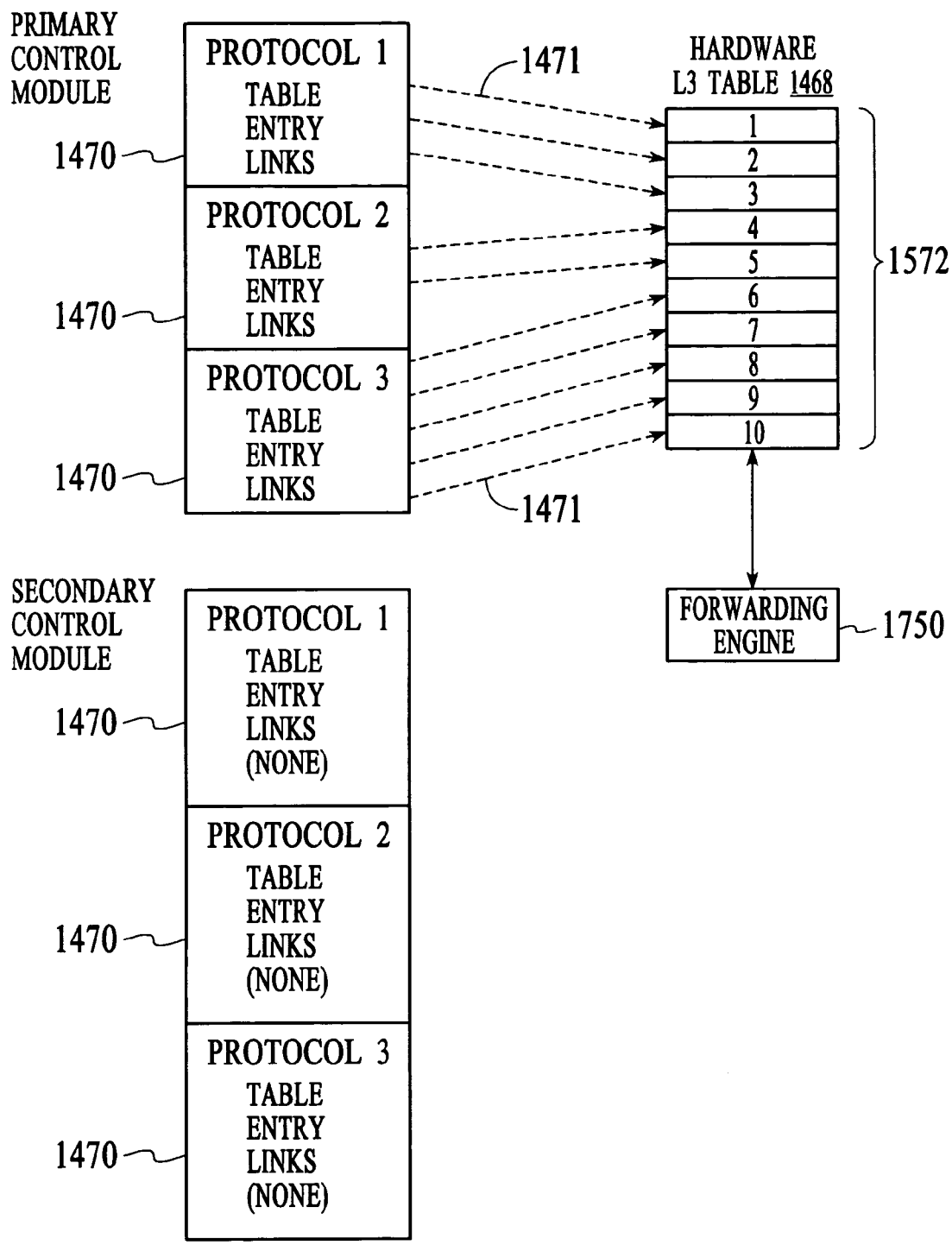
FIG. 15 depicts an example of table entry links that are established between hardware-based table entries and the primary control module of a network node.

Upon programming the Layer 3 table entries into the hardware-based tables, table entry links 1470 are established, as indicated by dashed lines 1471, within the primary control module. The table entry links identify the locations of the table entries within the hardware-based forwarding tables of the port interfaces and are used to manage the table entries in the hardware-based forwarding tables. FIG. 15 depicts an example of the table entry links 1470 that are established between the hardware-based table entries 1572 and the primary control module and indicated by dashed lines 1471. In an embodiment, the links are established by pointers that identify the location of each table entry in the hardware-based Layer 3 table. As depicted in FIG. 15, the table entry links are protocol-specific. That is, each table entry link is related to a particular protocol that is running on the control module (i.e., protocol 1, protocol 2, and protocol 3). In an embodiment, the table entry links to individual entries are formed into protocol-specific linked lists, such that each protocol has a linked list of all active table entries in the hardware-based tables.

While the primary control module is active, the secondary control module runs all of the Layer 3 protocols in a passive mode. In the passive mode, the secondary control module is not learning new routes and is not generating table entries and the corresponding table entry links. In addition, as depicted in FIG. 15, the secondary control module does not maintain table entry links to the hardware-based Layer 3 table entries 1572 when the primary control module is active.

Figure 16:
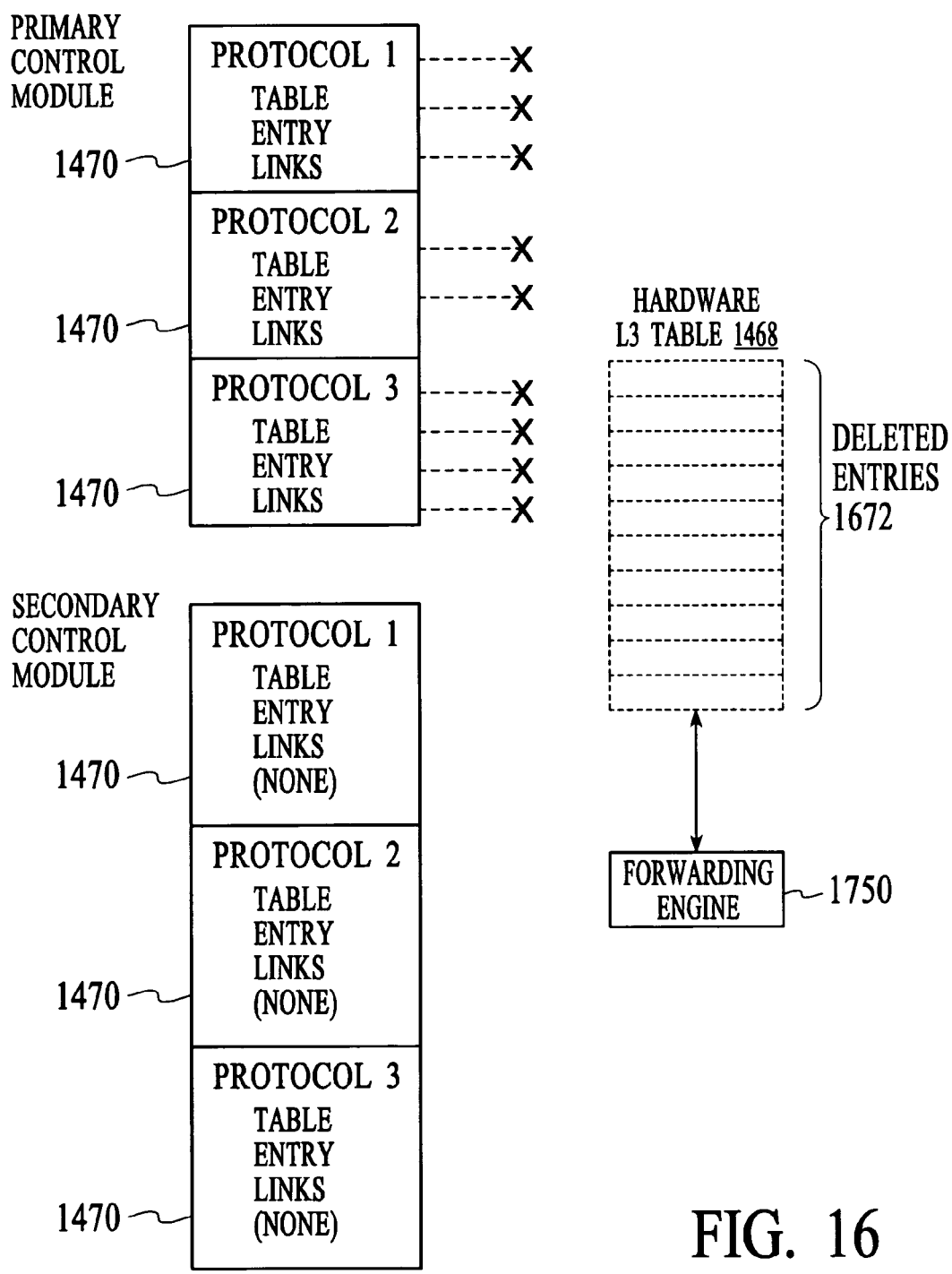
FIG. 16 depicts table entries that have been deleted and table entry links of the primary control module that are unusable after switchover from the primary control module to the secondary control module.

At switchover, the secondary control module takes over responsibility for forwarding packets and begins to execute the Layer 3 protocols. Although the secondary control module begins to execute the Layer 3 protocols upon switchover, it takes time for new table entries to be generated and programmed into the hardware-based Layer 3 tables. In addition, the secondary control module does not include links to the existing table entries that are programmed into the hardware-based Layer 3 tables. In the prior art, because the protocols running on the secondary control module do not have table entry links to the existing table entries that are programmed into the hardware-based Layer 3 tables, at switchover, the hardware-based Layer 3 table entries at the port interfaces are deleted. FIG. 16 depicts the state of the table entry links 1470 within the primary and secondary control modules at switchover in accordance with the prior art. As depicted, the table entry links within the primary control module are unusable based on the failure of the primary control module. Moreover, the secondary control module does not have any table entry links that can be used to identify the existing table entries in the hardware-based Layer 3 tables. Because there are no links available to identify the locations of the hardware-based Layer 3 table entries, the hardware-based table entries 1672 are deleted from the hardware-based Layer 3 tables at switchover. A disadvantage of deleting the Layer 3 table entries from the hardware-based tables at switchover is that all subsequent incoming packets must go through software-based forwarding until new Layer 3 table entries can be learned by the secondary control module and programmed into the hardware-based Layer 3 tables. Requiring all traffic to be forwarded using the relatively slow process of software-based forwarding may cause traffic to be lost.

One technique for preventing traffic loss after switchover is to maintain a copy of the table entry links within the secondary control module. A problem with maintaining a copy of the table entry links is that discrepancies may exist between the table entry links in the primary and secondary control modules if a switchover occurs before changes in the links at the primary control module are provided to the secondary control module.

In accordance with an embodiment of the invention, a technique for providing failure protection in a network node with primary and secondary control modules involves maintaining the existing Layer 3 table entries in the hardware-based Layer 3 tables after a switchover, generating links at the secondary control module to the existing table entries in the hardware-based Layer 3 tables, and using the links to systematically delete the existing table entries as new table entries are added by the secondary control module. Because the Layer 3 table entries are temporarily maintained after a switchover, traffic is able to be forwarded through the port interfaces without interruption while the secondary control module learns new routes and programs new table entries into the hardware-based tables. Moreover, the links to the existing Layer 3 table entries that are generated at switchover can be used to systematically delete the existing entries as new entries are added. Throughout the description, the existing table entries that are maintained in the hardware-based Layer 3 tables after switchover are referred to as "orphan" entries and the links that are generated to identify the existing table entries are referred to as "orphan" links. As is described in more detail below, the logic involved with generating the orphan links and systematically deleting the orphan entries is embodied in an orphan manager.

Figure 17:
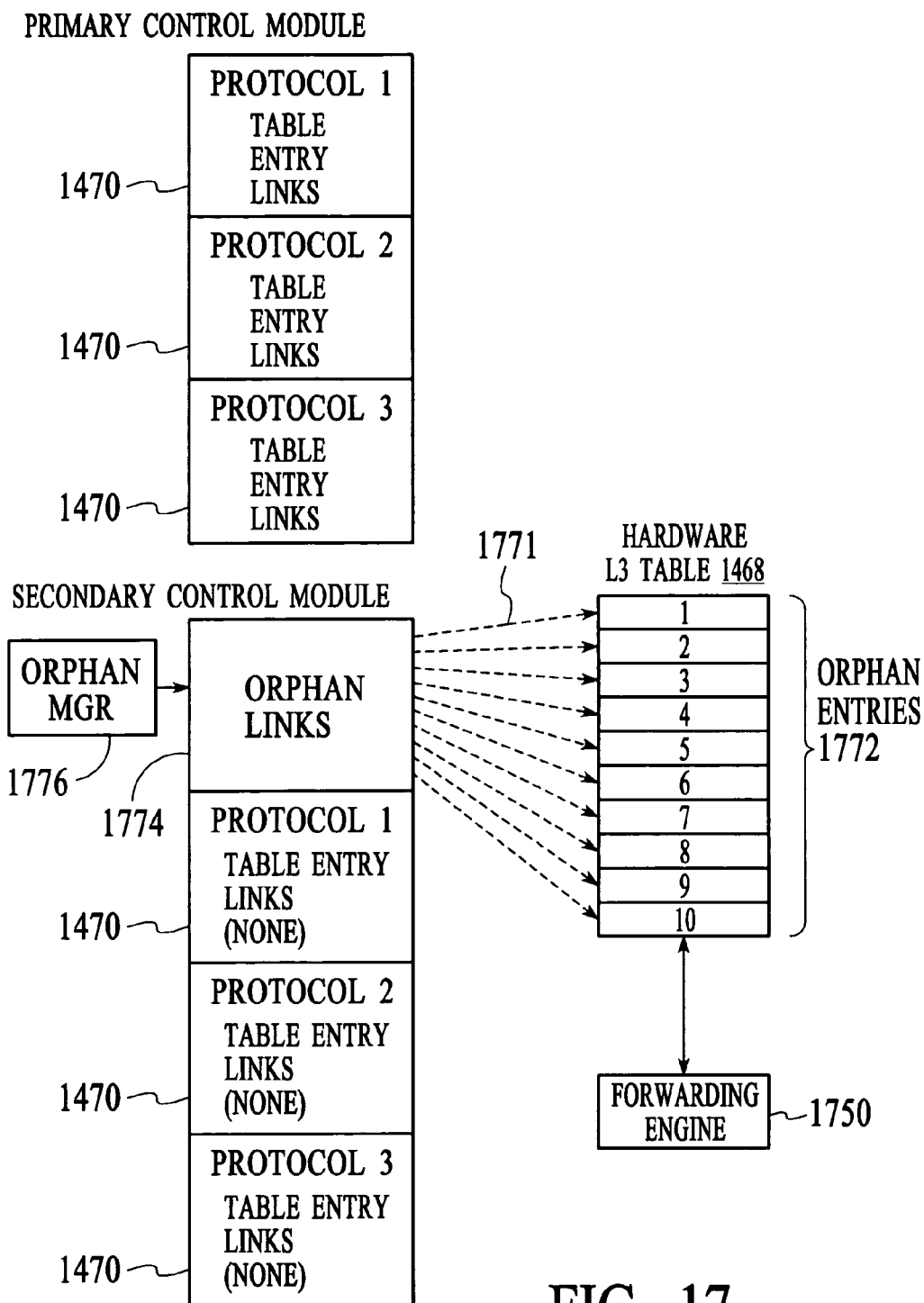
FIG. 17 depicts the existing table entries from FIG. 15 and orphan table entry links that are established by the secondary control module at switchover to manage the existing table entry links in accordance with an embodiment of the invention.

FIG. 17 depicts the example table entries from FIG. 15 with the orphan table entry links 1774 that are established at switchover in accordance with an embodiment of the invention. As depicted in FIG. 17, orphan table entry links are established at the secondary control module for each of the Layer 3 table entries 1772 that exists at switchover. The orphan links are established by parsing through the hardware-based Layer 3 table 1468 of each port interface and identifying the location of each entry in the table. In the embodiment of FIG. 17, an orphan manager 1776 within the secondary control module includes logic for establishing the orphan table entry links. Note that immediately after switchover, no new table entries have been programmed into the hardware-based Layer 3 table. Although no new table entries have been programmed into the hardware-based Layer 3 table, the orphan entries are available to the forwarding engine 1750 for high-speed traffic forwarding.

Figure 18:
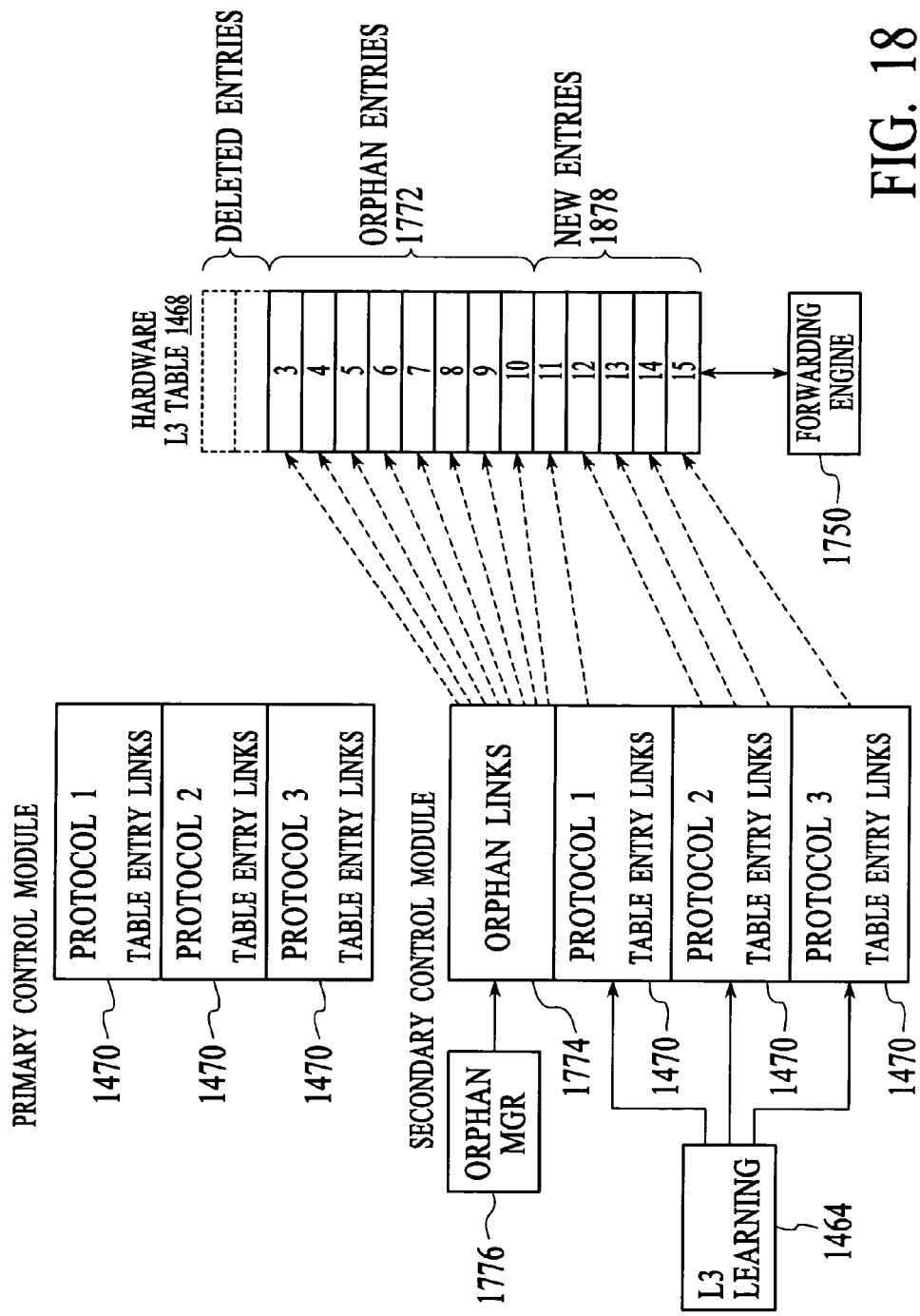
FIG. 18 depicts table entries that have been deleted using orphan table entry links, orphan table entries that are identified by orphan table entry links, and new table entries that are identified by new table entry links in accordance with an embodiment of the invention.

Some time after switchover, the secondary control module begins to generate its own table entries, to program those entries into the hardware-based Layer 3 tables of the port interfaces, and to generate the associated table entry links. The new table entries are generated in response to implementation of the forwarding protocols by the secondary control module. FIG. 18 depicts example table entries and associated table entry links that exist at some time after switchover. The example table entries and table entry links include some orphan table entries 1772 and associated table entry links 1774 and some new table entries 1878 and associated table entry links 1470. In addition to adding new table entries, some of the orphan table entries depicted in the example of FIG. 17 (i.e., table entries 1 and 2) have been deleted by the orphan manager.

The technique, or algorithm, that is used to determine how the orphan table entries are deleted is implementation specific. The orphan table entries can be deleted by, for example, aging. In an embodiment, an aging algorithm is defined by: number of orphan entries to delete per port interface per unit of time=[total number of orphan entries/(processor utilization*total number of port interfaces)]/total number of port interfaces.

Figure 19:
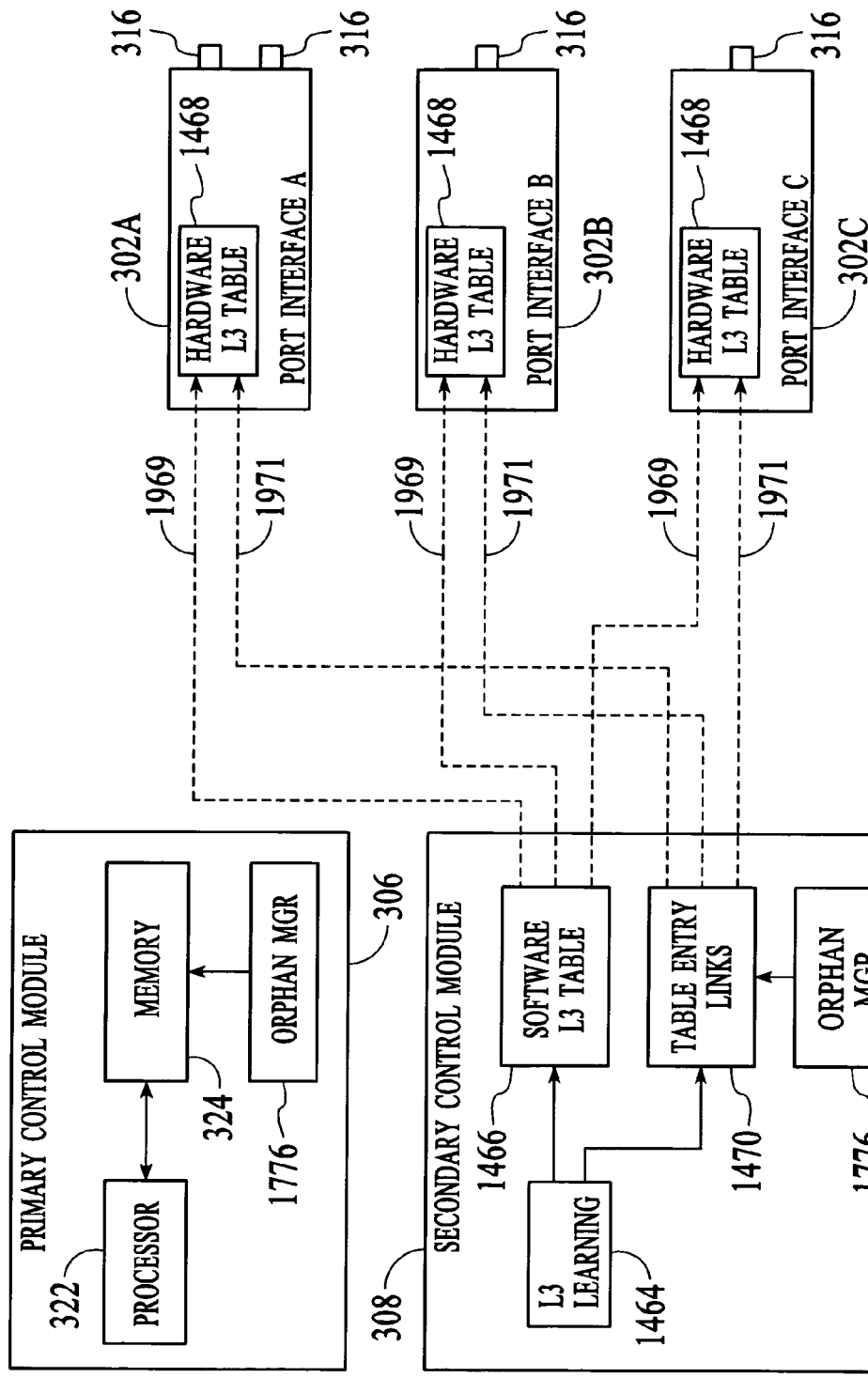
FIG. 19 is a logical depiction of the network node of FIG. 14 after switchover from the primary to the secondary control module, wherein orphan table entries from the hardware-based Layer 3 tables of multiple port interfaces are identified by orphan entry links and maintained for some period of time after switchover in accordance with an embodiment of the invention.

FIG. 19 is a logical depiction of the network node of FIG. 14 after switchover from the primary 306 to the secondary control module 308, wherein orphan table entries from all of the hardware-based Layer 3 tables 1468 are managed as described above with reference to FIGS. 17 and 18. As depicted in FIG. 19, the secondary control module includes a software-based Layer 3 table 1466, table entry links 1470, and an orphan manager 1476. The hardware-based Layer 3 tables of each port interface 302A–302C may include orphan table entries and new table entries that are programmed by the secondary control module. The programming of new table entries into the hardware-based Layer 3 tables is indicated by dashed lines 1969. The table entry links, as indicated by dashed lines 1971, may include orphan table entry links and new table entry links. The orphan manager of the secondary control module controls the deletion of the orphan entries from the hardware-based Layer 3 tables and uses the orphan entry links to identify the locations of the orphan entries in the hardware-based Layer 3 tables of all of the port interfaces.

Although the technique for synchronizing information in the software based tables of the primary and secondary control modules is described with reference to Layer 3 forwarding information, the technique can be used to synchronize any software-based forwarding information that is programmed into hardware-based tables. For example, software-based Layer 2 forwarding information in the primary and secondary control modules can be synchronized by generating orphan links to hardware-based table entries and then managing the existing orphan table entries using the orphan links.

Figure 20:
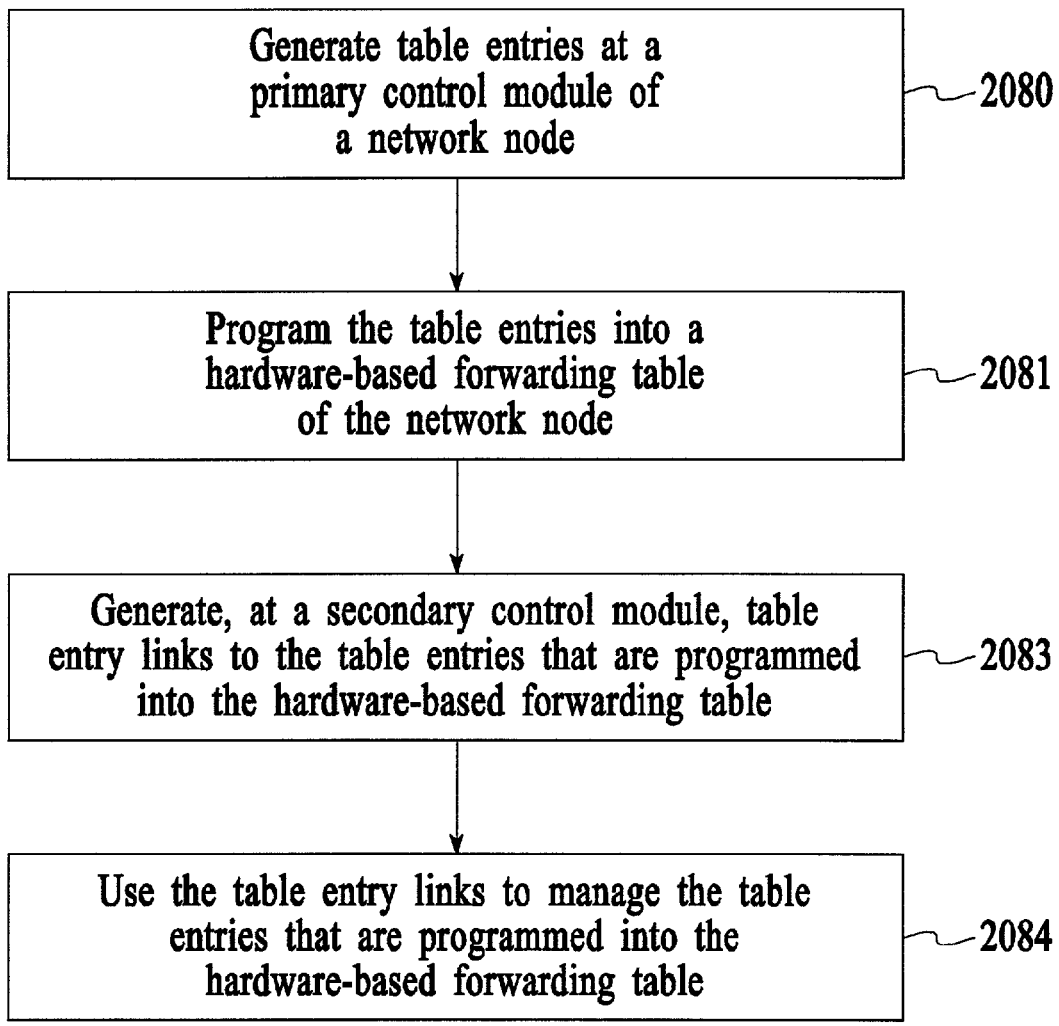
FIG. 20 depicts a process flow diagram of a method for providing failure protection in a network node with primary and secondary control modules in accordance with an embodiment of the invention.

FIG. 20 depicts an embodiment of a process flow diagram of the above-described technique for providing failure protection in a network node with primary and secondary control modules. At step 2080, table entries are generated at a primary control module of a network node. At step 2081, the table entries are programmed into a hardware-based forwarding table of the network node. At step 2083, table entry links, which identify the table entries that are programmed into the hardware-based forwarding table, are generated at a secondary control module. At step 2084, the table entry links are used to manage the table entries that are programmed into the hardware-based forwarding table.

Figure 21:
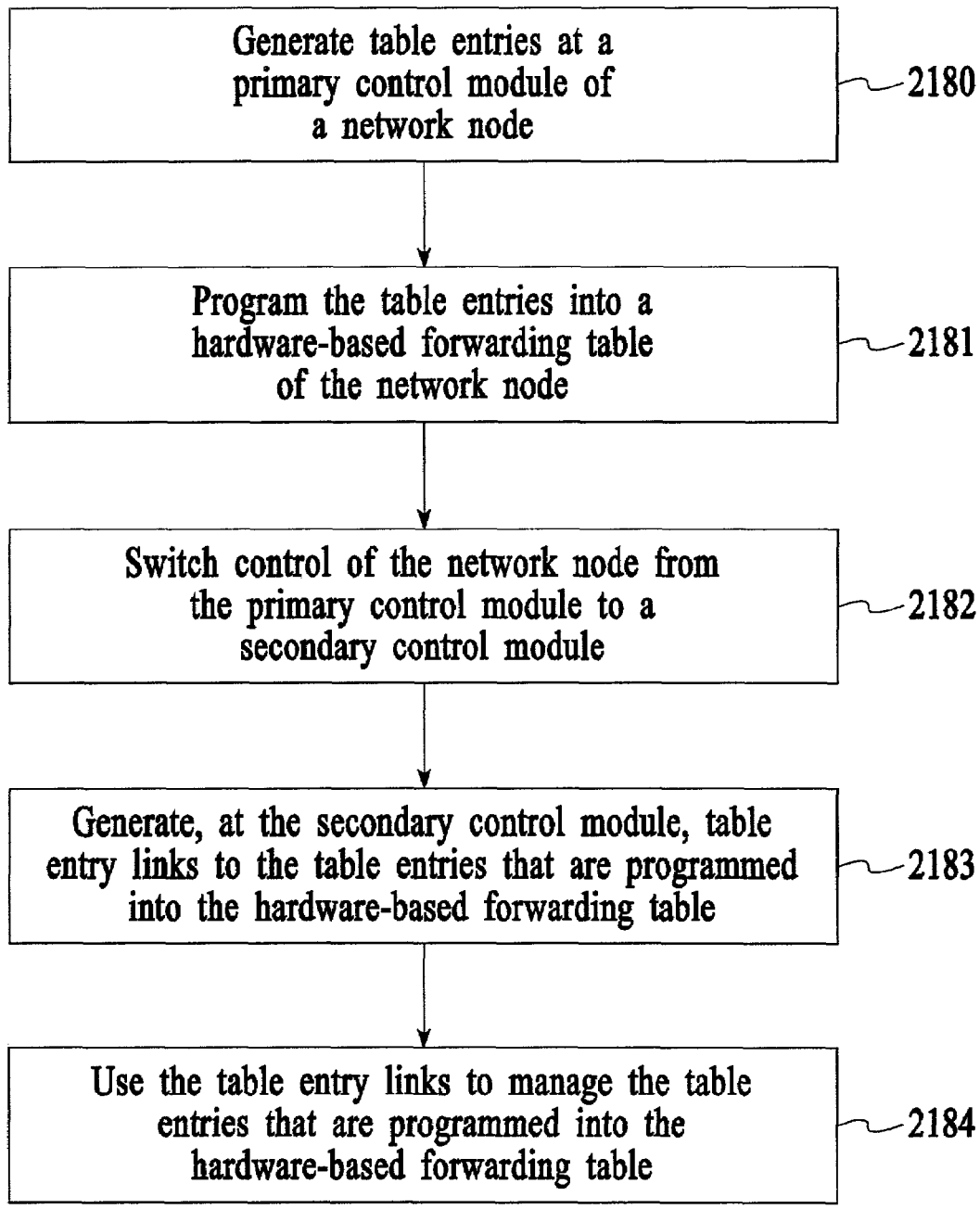
FIG. 21 depicts another process flow diagram of a method for providing failure protection in a network node with primary and secondary control modules in accordance with an embodiment of the invention.

FIG. 21 depicts an embodiment of a process flow diagram of the above-described technique for providing failure protection in a network node with primary and secondary control modules. The technique is similar to the technique described with reference to FIG. 20 except that the table entry links are not generated until after a switchover has occurred. At step 2180, table entries are generated at a primary control module of a network. At step 2181, the table entries are programmed into a hardware-based forwarding table of the network node. At step 2182, control of the network node is switched from the primary control module to a secondary control module. At step 2183, table entry links, which identify the table entries that are programmed into the hardware-based forwarding table, are generated at the secondary control module after switchover. At step 2184, the table entry links are used to manage the table entries that are programmed into the hardware-based forwarding table.

Although different techniques for providing failure protection have been described herein, in an embodiment, all of the above-described techniques are incorporated into the same system to provide a highly reliable failure protection system. In another embodiment, any combination of the above-described techniques may be incorporated into the same system to provide failure protection.

Although specific embodiments of the invention have been described and illustrated, the invention is not to be limited to the specific forms or arrangements of parts as described and illustrated herein. The invention is limited only by the claims.

What is claimed is:

1. A method for providing failure protection in a network node that includes primary and secondary control modules comprising:

executing a configuration command within said primary control module of said network node;

determining whether said executed configuration command causes a failure of said primary control module; and executing said configuration command within said secondary control module of said network node if execution of said configuration command does not cause a failure of said primary control module;

generating table entries at said primary control module of said network node;

programming said table entries into a hardware-based forwarding table of said network node;

gleaning said table entries from said hardware-based forwarding table; and storing said gleaned table entries in said secondary control module of said network node;

wherein said table entries are gleaned from said hardware-based forwarding table in the event of a switchover from said primary control module to said secondary control module.

2. The method of claim 1 further including forwarding said configuration command to said secondary control module only if execution of said configuration command does not cause a failure of said primary control module.

3. The method of claim 1 further including receiving said configuration command at both said primary and secondary control modules prior to executing said configuration command within said primary control module.

4. The method of claim 1 wherein said step of executing said configuration command includes establishing state information for the respective control module.

5. The method of claim 1 further including:

generating, at said secondary control module, table entry links to said table entries that are programmed into said hardware-based forwarding table; and using said table entry links to manage said table entries that are programmed into said hardware-based forwarding table.

6. The method of claim 5 further including a step of switching control of said network node from said primary control module to said secondary control module before said table entry links are generated at said secondary control module.

7. A method for providing failure protection in a network node that includes primary and secondary control modules comprising:

generating table entries at said primary control module of said network node;

programming said table entries into a hardware-based forwarding table of said network node;

gleaning said table entries from said hardware-based forwarding table; and storing said gleaned table entries in said secondary control module of said network node;

wherein said table entries are gleaned from said hardware-based forwarding table in the event of a switchover from said primary control module to said secondary control module.

8. The method of claim 7 further including switching control of said network node from said primary control module to said secondary control module in the event of a failure of said primary control module.

9. The method of claim 8 further including using said table entries in said secondary control module to forward traffic through said network node.

10. The method of claim 7 wherein said table entries are programmed into said hardware-based forwarding table from said primary control module.

11. The method of claim 7 wherein said step of gleaning said table entries includes parsing through said hardware-based forwarding table to identify said table entries.

12. The method of claim 7 wherein said table entries include forwarding information from Layer 2 of the Open System Interconnect Model as defined by the International Standards Organization.

13. The method of claim 7 wherein said step of storing said gleaned table entries in said secondary control module includes storing table entries in software-based forwarding tables.

14. The method of claim 7 wherein said table entries are programmed into said hardware-based forwarding table at a port interface.

15. The method of claim 7 wherein said table entries are programmed into hardware-based forwarding tables at multiple port interfaces and gleaned from said hardware-based forwarding tables at said multiple port interfaces.

16. The method of claim 7 further including:
generating Layer 3 table entries at said primary control module of said network node, where Layer three is defined in the Open System Interconnect Model by the International Standards Organization;
programming said Layer 3 table entries into a hardware-based forwarding table of said network node;
generating, at said secondary control module, table entry links to said Layer 3 table entries that are programmed into said hardware-based forwarding table; and
using said table entry links to manage said Layer 3 table entries that are programmed into said hardware-based forwarding table.

17. The method of claim 16 further including a step of switching control of said network node from said primary control module to said secondary control module before said table entry links are generated at said secondary control module.

18. A computer program product for providing failure protection in a network node that includes primary and secondary control modules, the computer program product comprising a computer-readable media having computer program readable program code thereon for executing on a computer, including computer-readable program code for:
gleaning table entries from a hardware-based forwarding table, said table entries having been programmed into said hardware-based forwarding table from said primary control module; and
storing said gleaned table entries in said secondary control module of said network node;
wherein said table entries are gleaned from said hardware-based forwarding table in the event of a switchover from said primary control module to said secondary control module.

19. The computer program product of claim 18 further including computer program code for switching control of said network node from said primary control module to said secondary control module in the event of a failure of said primary control module.

20. The computer program product of claim 18 further including computer program code for storing said gleaned table entries in a software-based forwarding table.

21. The computer program product of claim 18 further including computer program code for gleaning table entries from hardware-based forwarding tables at multiple port interfaces.

22. The computer program product of claim 18 wherein said table entries include forwarding information from Layer 2 of the Open System Interconnect Model as defined by the International Standards Organization.

23. A system for providing failure protection in a network node comprising:
a primary control module; and
a secondary control module, said secondary control module including glean logic that is configured to glean table entries from a hardware-based forwarding table and to store said gleaned table entries in said secondary control module of said network node, said table entries having been programmed into said hardware-based forwarding table from said primary control module;
wherein said glean logic gleans said table entries from said hardware-based forwarding table in the event of a switchover from said primary control module to said secondary control module.

24. The system of claim 23 wherein said secondary control module is configured to assume control of said network node in the event of a failure of said primary control module.

25. The system of claim 23 wherein said gleaned table entries are stored in a software-based forwarding table.

26. The system of claim 23 wherein said glean logic gleans table entries from hardware-based forwarding tables at multiple port interfaces.

27. The system of claim 23 wherein said table entries include Layer 2 forwarding information, wherein Layer 2 is defined in the Open System Interconnect Model by the International Standards Organization.

28. A method for providing failure protection in a network node that includes primary and secondary control modules comprising:
generating table entries at said primary control module of said network node;
programming said table entries into a hardware-based forwarding table of said network node;
generating, at said secondary control module, table entry links to said table entries that are programmed into said hardware-based forwarding table;
using said table entry links to manage said table entries that are programmed into said hardware-based forwarding table; and
switching control of said network node from said primary control module to said secondary control module;
wherein said step of switching control of said network node from said primary control module to said secondary control module is executed before said table entry links are generated at said secondary control module.

29. The method of claim 3 further including maintaining said table entries in said hardware-based forwarding table upon switching control of said network node from said primary control module to said secondary control module.

30. The method of claim 3 further including locating said table entries within said hardware-based forwarding table using said table entry links that are generated at said secondary control module.

31. The method of claim 30 further including deleting said table entries according to a deletion algorithm.

32. The method of claim 3 further including generating new table entries at said secondary control module.

33. The method of claim 32 further including programming said new table entries into said hardware-based forwarding table.

34. The method of claim 28 wherein said table entries contain forwarding information from Layer 3 of the Open System Interconnect Model as defined by the International Standards Organization.

35. The method of claim 28 wherein generating table entries includes running a routing protocol.

36. The method of claim 28 wherein said table entries are programmed into a hardware-based forwarding table at a port interface.

37. The method of claim 36 wherein said table entries are programmed into hardware-based forwarding tables at multiple port interfaces and wherein said table entry links are generated for table entries that are programmed into said hardware-based forwarding tables at said multiple port interfaces.

38. The method of claim 28 wherein said step of generating table entry links includes parsing through said hardware-based forwarding table.

39. A computer program product for providing failure protection in a network node that includes primary and secondary control modules, the computer program product comprising a computer-readable media having computer program readable program code thereon for executing on a computer, including computer-readable program code for:
generating table entry links to table entries that are programmed into a hardware-based forwarding table; and
managing, using said table entry links, said table entries that are programmed into said hardware-based forwarding table, said table entries being managed from said secondary control module;
wherein said table entries are generated at said primary control module and programmed into said hardware-based forwarding table by said primary control module and wherein said table entry links are generated at said secondary control module after control of said network node is switched over from said primary control module to said secondary control module.

40. The computer program product of claim 39 wherein said table entries are managed using said table entry links after control of said network node is switched over from said primary control module to said secondary control module.

41. The computer program product of claim 39 further including computer program code for deleting said table entries according to a deletion algorithm.

42. The computer program product of claim 39 further including computer program code for parsing through said hardware-based forwarding table to generate said table entry links.

43. The computer program product of claim 39 further including computer program code for generating table entry links to table entries that are programmed into hardware-based forwarding tables at multiple port interfaces.

44. The computer program product of claim 43 further including computer program code for managing, using said table entry links, said table entries that are programmed into hardware-based forwarding tables at said multiple port interfaces.

45. The computer program product of claim 39 wherein said table entries contain forwarding information from Layer 3 of the Open System Interconnect Model as defined by the International Standards Organization.

46. A system for providing failure protection in a network node comprising:
a primary control module; and
a secondary control module, said secondary control module including an orphan manager for;
generating table entry links to table entries that are programmed into a hardware-based forwarding table; and
managing, using said table entry links, said table entries that are programmed into said hardware-based forwarding table, said table entries being managed from said secondary control module;
wherein said table entries are generated at said primary control module and programmed into said hardware-based forwarding table by said primary control module, and wherein said table entry links are generated at said secondary control module after control of said network node is switched over from said primary control module to said secondary control module.

47. The system of claim 46 wherein said orphan manager manages said table entries using said table entry links after control of said network node is switched over from said primary control module to said secondary control module.

48. The system of claim 46 wherein said orphan manager deletes said table entries according to a deletion algorithm.

49. The system of claim 46 wherein said orphan manager includes logic for parsing through said hardware-based forwarding table to generate said table entry links.

50. The system of claim 46 wherein said orphan manager generates table entry links to table entries that are programmed into hardware-based forwarding tables at multiple port interfaces.

51. The system of claim 50 wherein said orphan manager uses said table entry links to manage said table entries that are programmed into hardware-based forwarding tables at said multiple port interfaces.

52. The system of claim 46 wherein said table entries contain forwarding information from Layer 3 of the Open System Interconnect Model as defined by the International Standards Organization.

53. A method for providing failure protection in a network node that includes primary and secondary control modules comprising:
executing a configuration command within said primary control module of said network node;
determining whether said executed configuration command causes a failure of said primary control module; and
executing said configuration command within said secondary control module of said network node if execution of said configuration command does not cause a failure of said primary control module;
generating table entries at said primary control module of said network node;
programming said table entries into a hardware-based forwarding table of said network node;
gleaning said table entries from said hardware-based forwarding table;
storing said gleaned table entries in said secondary control module of said network node;
generating, at said secondary control module, table entry links to said table entries that are programmed into said hardware-based forwarding table;
using said table entry links to manage said table entries that are programmed into said hardware-based forwarding table; and
switching control of said network node from said primary control module to said secondary control module before said table entry links are generated at said secondary control module.

54. A method for providing failure protection in a network node that includes primary and secondary control modules comprising:
generating table entries at said primary control module of said network node;

programming said table entries into a hardware-based forwarding table of said network node;
gleaning said table entries from said hardware-based forwarding table; and
storing said gleaned table entries in said secondary control module of said network node;
wherein said table entries are programmed into hardware-based forwarding tables at multiple port interfaces and gleaned from said hardware-based forwarding tables at said multiple port interfaces.

55. A method for providing failure protection in a network node that includes primary and secondary control modules comprising:
generating table entries at said primary control module of said network node;
programming said table entries into a hardware-based forwarding table of said network node;
gleaning said table entries from said hardware-based forwarding table;
storing said gleaned table entries in said secondary control module of said network node;
generating Layer 3 table entries at said primary control module of said network node, where Layer three is defined in the Open System Interconnect Model by the International Standards Organization;
generating, at said secondary control module, table entry links to said Layer 3 table entries that are programmed into said hardware-based forwarding table;
using said table entry links to manage said Layer 3 table entries that are programmed into said hardware-based forwarding table; and
switching control of said network node from said primary control module to said secondary control module before said table entry links are generated at said secondary control module.

56. A system for providing failure protection in a network node comprising:
a primary control module; and
a secondary control module, said secondary control module including glean logic that is configured to glean table entries from a hardware-based forwarding table and to store said gleaned table entries in said secondary control module of said network node, said table entries having been programmed into said hardware-based forwarding table from said primary control module;
wherein said glean logic gleans table entries from hardware-based forwarding tables at multiple port interfaces.

57. A method for providing failure protection in a network node that includes primary and secondary control modules comprising:
generating table entries at said primary control module of said network node;
programming said table entries into a hardware-based forwarding table of said network node;
generating, at said secondary control module, table entry links to said table entries that are programmed into said hardware-based forwarding table; and
using said table entry links to manage said table entries that are programmed into said hardware-based forwarding table;
wherein said table entries are programmed into hardware-based forwarding tables at multiple port interfaces and wherein said table entry links are generated for table entries that are programmed into said hardware-based forwarding tables at said multiple port interfaces.

58. A computer program product for providing failure protection in a network node that includes primary and secondary control modules, the computer program product comprising a computer-readable media having computer program readable program code thereon for executing on a computer, including computer-readable program code for:
generating table entry links to table entries that are programmed into a hardware-based forwarding table; and
managing, using said table entry links, said table entries that are programmed into said hardware-based forwarding table, said table entries being managed from said secondary control module;
wherein said table entry links are generated after control of said network node is switched over from said primary control module to said secondary control module.

59. A system for providing failure protection in a network node comprising:
a primary control module; and
a secondary control module, said secondary control module including an orphan manager for;
generating table entry links to table entries that are programmed into a hardware-based forwarding table; and
managing, using said table entry links, said table entries that are programmed into said hardware-based forwarding table, said table entries being managed from said secondary control module;
wherein said table entry links are generated by said orphan manager after control of said network node is switched over from said primary control module to said secondary control module.

60. A system for providing failure protection in a network node comprising:
a primary control module; and
a secondary control module, said secondary control module including an orphan manager for;
generating table entry links to table entries that are programmed into a hardware-based forwarding table; and
managing, using said table entry links, said table entries that are programmed into said hardware-based forwarding table, said table entries being managed from said secondary control module;
wherein said orphan manager manages said table entries using said table entry links after control of said network node is switched over from said primary control module to said secondary control module.

* * * * *